US011019540B2

(12) United States Patent
Quan et al.

(10) Patent No.: US 11,019,540 B2
(45) Date of Patent: May 25, 2021

(54) USER EQUIPMENT PATH TRANSFER METHOD, USER EQUIPMENT STATE CONVERSION CONTROL METHOD, USER EQUIPMENT, AND BASE STATION

(71) Applicant: CHINA ACADEMY OF TELECOMMUNICATIONS TECHNOLOGY, Beijing (CN)

(72) Inventors: Haiyang Quan, Beijing (CN); Chandrika Kumudinie Worrall, Beijing (CN); Li Chen, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/321,375

(22) PCT Filed: Jun. 21, 2017

(86) PCT No.: PCT/CN2017/089311
§ 371 (c)(1),
(2) Date: Jan. 28, 2019

(87) PCT Pub. No.: WO2018/019057
PCT Pub. Date: Feb. 1, 2018

(65) Prior Publication Data
US 2019/0174421 A1    Jun. 6, 2019

(30) Foreign Application Priority Data

Jul. 29, 2016   (CN) .......................... 201610620971.5

(51) Int. Cl.
*H04W 36/00* (2009.01)
*H04W 48/08* (2009.01)
(Continued)

(52) U.S. Cl.
CPC ....... *H04W 36/0069* (2018.08); *H04W 36/00* (2013.01); *H04W 36/32* (2013.01);
(Continued)

(58) Field of Classification Search
CPC ............. H04W 36/32; H04W 52/0274; H04W 36/0069; H04W 76/27; H04W 36/0005;
(Continued)

(56) References Cited

U.S. PATENT DOCUMENTS 9,967,801 B2 *  5/2018  Byun ...................... H04W 8/06
2012/0190402 A1  7/2012  Whang
(Continued)

FOREIGN PATENT DOCUMENTS

CN      105144833 A     12/2015
CN      105612804 A      5/2016
(Continued)

OTHER PUBLICATIONS

European Patent Office, Date: Jan. 27, 2020, PCT/CN2017089311, Applicant: China Academy of Telecommunications Technology, Communication, European Search Report.
(Continued)

*Primary Examiner* — Omer S Mian
(74) *Attorney, Agent, or Firm* — Flener IP & Business Law; Zareefa B. Flener

(57) ABSTRACT

A UE path transfer method, a UE state conversion control method, a UE and a base station are provided. The UE path transfer method includes: acquiring a control instruction for controlling a UE to be switched from a dual-connection state into an inactive state from a first source access base station communicating with the UE via a first RAT, the dual-connection state of the UE being a state where a communication connection is established between the UE and the first source access base station via the first RAT and a further (Continued)

communication connection is established between the UE and a second source access base station via a second RAT; controlling the UE to be switched from the dual-connection state into the inactive state in accordance with the control instruction; and transmitting a link connection request to a target access base station and enabling the UE to access a core network via the target access base station when the UE in the inactive state is moved.

14 Claims, 12 Drawing Sheets

(51) Int. Cl.
*H04W 76/30* (2018.01)
*H04W 76/27* (2018.01)
*H04W 36/32* (2009.01)
*H04W 52/02* (2009.01)
*H04W 76/15* (2018.01)

(52) U.S. Cl.
CPC ....... *H04W 48/08* (2013.01); *H04W 52/0274* (2013.01); *H04W 76/27* (2018.02); *H04W 76/30* (2018.02); *H04W 76/15* (2018.02)

(58) Field of Classification Search
CPC ................ H04W 48/08; H04W 76/30; H04W 436/0033; H04W 36/0085; H04L 63/08
See application file for complete search history.

(56) References Cited

U.S. PATENT DOCUMENTS

| | | | |
|---|---|---|---|
| 2015/0146562 A1 | 5/2015 | Sivanesan et al. | |
| 2015/0146599 A1 | 5/2015 | Jha et al. | |
| 2015/0208366 A1 | 7/2015 | Papasakellariou et al. | |
| 2016/0037401 A1 | 2/2016 | Lee et al. | |
| 2016/0057663 A1* | 2/2016 | Teyeb ............... | H04W 36/0027 455/436 |
| 2016/0150458 A1 | 5/2016 | Wang et al. | |
| 2016/0165627 A1 | 6/2016 | Uemura et al. | |
| 2016/0183103 A1 | 6/2016 | Saily et al. | |
| 2016/0255552 A1 | 9/2016 | Uchino et al. | |
| 2017/0331670 A1* | 11/2017 | Parkvall ............... | G08B 25/004 |
| 2018/0242271 A1* | 8/2018 | Rune ..................... | H04W 76/15 |
| 2019/0159103 A1 | 5/2019 | Wang et al. | |

FOREIGN PATENT DOCUMENTS

| | | |
|---|---|---|
| CN | 105659692 A | 6/2016 |
| JP | 2016529804 A | 9/2016 |
| WO | 2014172306 A2 | 10/2014 |
| WO | 2015115176 A1 | 8/2015 |
| WO | 2015115860 A1 | 8/2015 |

OTHER PUBLICATIONS

3GPP TSG-RAN WG2 #94 Tdoc R2-163993, Nanjing, China, May 23-27, 2016, Agenda Item: 9.4.1.2, Source: Ericsson, Title: NR/LTE tight interworking: CP requirements on Mobility and Dual Connectivity, Document for: Discussion and Decision.

3GPP TSG-RAN WG3 #91bis R3-160845, Bangalore, India, Apr. 11-15, 2016, Source: Ericsson, Title: Handling of inactive UEs, Agenda Item: 10.2.1, Document for: Discussion and Decision.

3GPP TSG-RAN WG3 #92 Tdoc R3-161290, Nanjing, P.R.China, May 23-27, 2016, Agenda Item: 10.2.1, Source: Ericsson, Title: Handling of UEs in RAN during periods of no traffic, Document for: Discussion, Decision.

Notice of Reasons for Refusal, Application number: Japanese Patent Application No. 2019-504780, Date of Drafting: Reiwa 1 Nov. 20, 2019, 3794 5J00, Representative/Applicant: Fujita, Kazuko, Applied Provisions: The first item of Article 29, Article 29(2).

Patent Cooperation Treaty, Written Opinion of the International Searching Authority, dated Aug. 25, 2017, PCT/CN2017/089311, China Academy of Telecommunications Technology.

First Office Action, The State Intellectual Property Office of People's Republic of China, 201610620971.5, China Academy of Telecommunications Technology, Terminal Path Transfer Method, Method of Controlling Terminal State Transition, Terminal and Base Station.

TDOC R2-163998, Nanjing, P.R.China, May 23-27, 2016, Agenda Item: 9.4.3.2.2, Source: Ericsson, Title: Handling of Inactive UES, Document for: Discussion, Decision.

TDOC R2-164028, Nanjing, P.R.China, May 23-27, 2016, Agenda Item: 9.4.2, Source: Ericsson, Title: Infrequent Small Data Transmissions for Inactive UES, Document for: Discussion, Decision.

S2-163312, SA WG2 Meeting #116, Jul. 11-15, 2016, Vienna, Austria, Source: Ericsson, Title: Solution for Infrequent Small Data, Document for: Approval, Agenda Item: 6.10.4, Work Item / Release: FS_NEXTGEN / REL-14.

* cited by examiner generating a control instruction for controlling a UE to be switched from a dual-connection state into an inactive state, the dual-connection state of the UE being a state where a communication connection is established between the UE and a first source access base station via a first RAT and a further communication connection is established between the UE and a second source access base station via a second RAT — 111 transmitting the control instruction for controlling the UE to be switched from the dual-connection state into the inactive state to the UE, so as to control the UE to be switched from the dual-connection state into the inactive state in accordance with the control instruction — 112

Fig.11

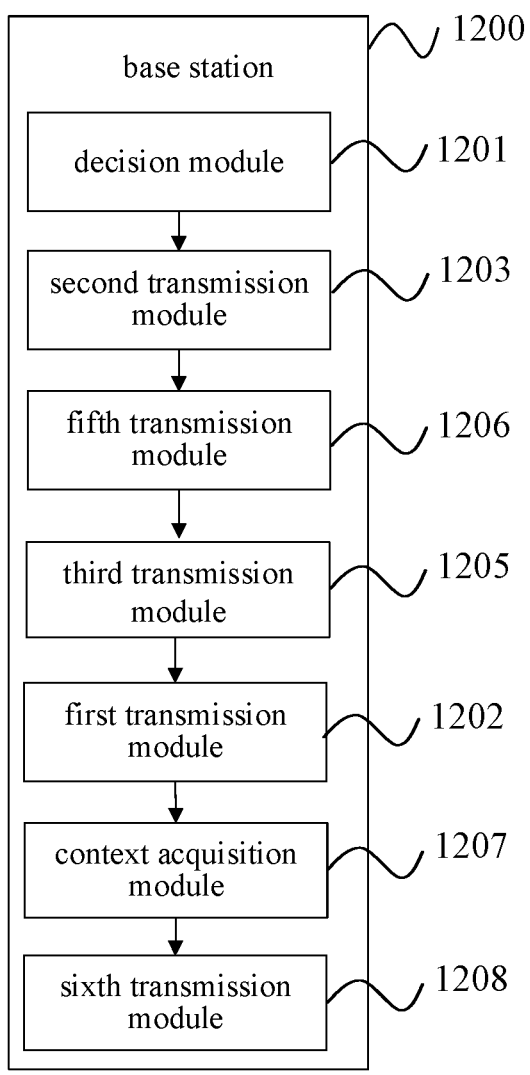

Fig.12 acquiring a notification message for configuring a UE to be in an inactive state from a first source access base station, the notification message being transmitted after the first source access base station has generated a control instruction for controlling the UE to be switched from a dual-connection state into the inactive state, the dual-connection state being a state where a communication connection is established between the UE and a first source access base station via a first RAT and a further communication connection is established between the UE and a second source access base station via a second RAT  — 131 transmitting second RAT link configuration information to the first source access base station in accordance with the notification message, so as to enable the first source access base station to transmit the second RAT link configuration information and pre-configured first RAT link configuration information to the UE and control the UE to be switched from the dual-connection state into the inactive state, the first RAT link configuration information including a first predetermined active region and first UE identification information, and the second RAT link configuration information including a second predetermined active region and second UE identification information  — 132

Fig.13

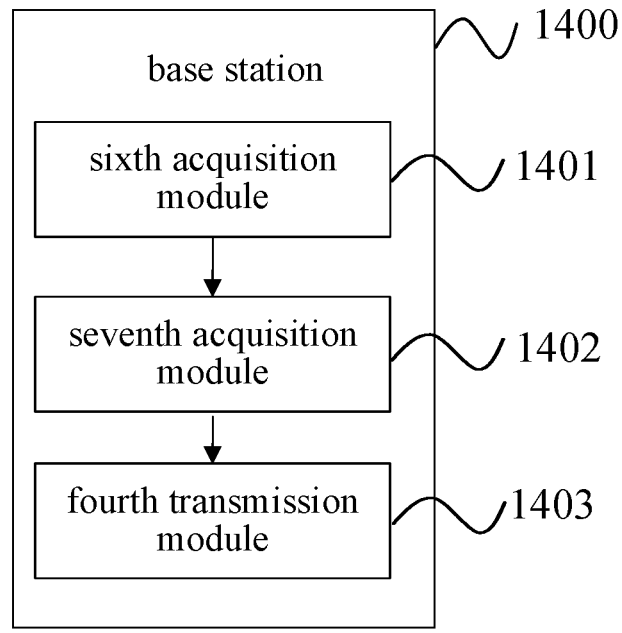

Fig.14

USER EQUIPMENT PATH TRANSFER METHOD, USER EQUIPMENT STATE CONVERSION CONTROL METHOD, USER EQUIPMENT, AND BASE STATION

CROSS-REFERENCE TO RELATED APPLICATION

The present application is the U.S. national phase of PCT Application No. PCT/CN2017/089311 filed on Jun. 21, 2017, which claims a priority of the Chinese patent application No. 201610620971.5 filed on Jul. 29, 2016, and which are incorporated herein by reference in their entireties.

TECHNICAL FIELD

The present disclosure relates to the field of communication technology, in particular to a User Equipment (UE) path transfer method, a UE state conversion control method, a UE and a base station.

BACKGROUND

For various needs and goals of a $5^{th}$-Generation (5G) mobile communication system, it is necessary to support a tight interworking operation between a Long Term Evolution (LTE) system and the 5G mobile communication system. In addition, a new state (or sub-state), i.e., an inactive state, has been introduced into the 5G mobile communication system. The inactive state differs from an idle state in that UE context information about a UE is reserved at a Radio Access Network (RAN) side. The inactive state differs from a normal connected state in that no dedicated resource has been allocated for the UE, and the mobility is controlled by the UE within a pre-configured range in a mode similar to cell reselection, rather than by a network. When the 5G mobile communication system and the LTE system coexist in the network deployment and the tight interworking operation occurs, there may exist such a circumstance where a same UE is served by base stations belonging to the two systems. In this circumstance, when the UE needs to enter the inactive state or the UE in the inactive state needs to be switched to another system and operate, there is an urgent need to provide a scheme for achieving the conversion between the connected state and the inactive state and transferring a UE path.

SUMMARY

An object of the present disclosure is to provide a UE path transfer method, a UE state conversion control method, a UE and a base station, so as to achieve the conversion of the UE state and transfer the UE path when the UE is served by base stations of two communication systems simultaneously.

In one aspect, the present disclosure provides in some embodiments a UE path transfer method, including: acquiring a control instruction for controlling a UE to be switched from a dual-connection state into an inactive state from a first source access base station communicating with the UE via a first Radio Access Technology (RAT), the dual-connection state of the UE being a state where a communication connection is established between the UE and the first source access base station via the first RAT and a further communication connection is established between the UE and a second source access base station via a second RAT; controlling the UE to be switched from the dual-connection state into the inactive state in accordance with the control instruction; and transmitting a link connection request to a target access base station and enabling the UE to access a core network via the target access base station when the UE in the inactive state is moved.

In a possible embodiment of the present disclosure, prior to controlling the UE to be switched from the dual-connection state into the inactive state in accordance with the control instruction, the method further includes: acquiring first RAT link configuration information and second RAT link configuration information transmitted from the first source access base station. The first RAT link configuration information includes a first predetermined active region and first UE identification information, and the second RAT link configuration information includes a second predetermined active region and second UE identification information. The second RAT link configuration information is acquired by the first source access base station from the second source access base station.

In a possible embodiment of the present disclosure, the transmitting the link connection request to the target access base station and enabling the UE to access the core network via the target access base station includes: transmitting the link connection request to the target access base station via a Radio Resource Control (RRC) message, and enabling the UE to access the core network via the target access base station. The first UE identification information and/or the second UE identification information are carried in the RRC message.

In a possible embodiment of the present disclosure, the transmitting the link connection request to the target access base station and enabling the UE to access the core network via the target access base station when it is detected that the UE in the inactive state is moved includes: when it is detected that the UE in the inactive state is moved from the first predetermined active region to the second predetermined active region or is moved out of each of the first predetermined active region and the second predetermined active region, transmitting the link connection request to the target access base station, and enabling the UE to access the core network via the target access base station.

In a possible embodiment of the present disclosure, the target access base station is the second source access base station. The transmitting the link connection request to the target access base station and enabling the UE to access the core network via the target access base station includes: transmitting the link connection request carrying the second UE identification information and the first UE identification information to the second source access base station; and recovering the communication connection between the UE and the second source access base station in accordance with the first UE identification information or the second UE identification information, and enabling the UE to access the core network via the second source access base station.

In a possible embodiment of the present disclosure, the target access base station is a base station other than the first source access base station and the second source access base station. The transmitting the link connection request to the target access base station and enabling the UE to access the core network via the target access base station includes: transmitting the link connection request carrying the first UE identification information and the second UE identification information to the target access base station; and establishing a connection between the UE and the target access base station in accordance with the first UE identification information or the second UE identification information, and enabling the UE to access the core network via the target access base station.

In a possible embodiment of the present disclosure, subsequent to, when it is detected that the UE in the inactive state is moved, transmitting the link connection request to the target access base station and enabling the UE to access the core network via the target access base station, the UE path transfer method further includes: acquiring reconfiguration information from the target access base station, the reconfiguration information including UE identification information and a UE-movable region allocated by the target access base station for the UE.

In another aspect, the present disclosure provides in some embodiments a UE, including: a first acquisition module configured to acquire a control instruction for controlling a UE to be switched from a dual-connection state into an inactive state from a first source access base station communicating with the UE via a first RAT, the dual-connection state of the UE being a state where a communication connection is established between the UE and the first source access base station via the first RAT and a further communication connection is established between the UE and a second source access base station via a second RAT; a control module configured to control the UE to be switched from the dual-connection state into the inactive state in accordance with the control instruction; and a processing module configured to transmit a link connection request to a target access base station and enable the UE to access a core network via the target access base station when it is detected that the UE in the inactive state is moved.

In a possible embodiment of the present disclosure, the UE further includes a second acquisition module configured to acquire first RAT link configuration information and a second RAT link configuration information from the first source access base station. The first RAT link configuration information includes a first predetermined active region and first UE identification information, and the second RAT link configuration information includes a second predetermined active region and second UE identification information. The second RAT link configuration information is acquired by the first source access base station from the second source access base station.

In yet another aspect, the present disclosure provides in some embodiments a UE path transfer method, including: acquiring a link connection request from a UE having been switched from a dual-connection state into an inactive state, the dual-connection state of the UE being a state where a communication connection is established between the UE and a first source access base station via a first RAT and a further communication connection is established between the UE and a second source access base station via a second RAT; acquiring link access information of the UE in accordance with the link connection request; and establishing a connection with the UE in accordance with the link access information, and enabling the UE to access a core network.

In a possible embodiment of the present disclosure, the acquiring the link connection request from the UE having been switched from the dual-connection state into the inactive state includes: acquiring the link connection request from the UE having been switched from the dual-connection state into the inactive state via a RRC message. The link connection request includes first UE identification information and second UE identification information from the first source access base station when the UE is in the dual-connection state prior to the inactive state. The first UE identification information is a UE identifier in first RAT link configuration information corresponding to the first source access base station, and the second UE identification information is a UE identifier in second RAT link configuration information corresponding to the second resource access base station and acquired by the first source access base station from the second source access base station.

In a possible embodiment of the present disclosure, the acquiring the link access information of the UE in accordance with the link connection request includes: acquiring context information of the UE in accordance with the first UE identification information or the second UE identification information.

In a possible embodiment of the present disclosure, the acquiring the context information of the UE in accordance with the first UE identification information or the second UE identification information includes: when the context information of the UE is stored in each of the first source access base station and the second source access base station, acquiring the context information of the UE from the first source access base station in accordance with the first UE identification information, or acquiring the context information of the UE from the second source access base station in accordance with the second UE identification information; when the context information of the UE is stored in the first source access base station rather than the second source access base station, acquiring the context information of the UE from the first source access base station in accordance with the first UE identification information; and when the context information of the UE is stored in the second source access base station rather than the first source access base station, acquiring the context information of the UE from the second source access base station in accordance with the second UE identification information.

In a possible embodiment of the present disclosure, the establishing the connection with the UE in accordance with the link access information and enabling the UE to access the core network includes: when the first source access base station has notified the second source access base station to release a connection path between the second source access base station and the core network and a RAT type of a target access base station is the same as a RAT type of the second source access base station, establishing a connection path between the target access base station and the core network in accordance with the link access information of the UE, and enabling the UE to access the core network via the connection path between the target access base station and the core network.

In a possible embodiment of the present disclosure, subsequent to enabling the UE to access the core network via the connection path between the target access base station and the core network, the UE path transfer method further includes: notifying the first source access base station to release a connection path between the first source access base station and the core network.

In a possible embodiment of the present disclosure, the establishing the connection with the UE in accordance with the link access information and enabling the UE to access the core network includes, when the first source access base station has notified the second source access base station to suspend the connection path between the second source access base station and the core network and the target access base station is the second source access base station, recovering the connection path between the second source access base station and the core network in accordance with the link access information of the UE, and enabling the UE to access the core network via the recovered connection path between the second source access base station and the core network.

In a possible embodiment of the present disclosure, subsequent to enabling the UE to access the core network via the recovered connection path between the second source access base station and the core network, the UE path transfer method further includes: notifying the first source access base station to suspend the connection path between the first source access base station and the core network.

In a possible embodiment of the present disclosure, the establishing the connection with the UE in accordance with the link access information and enabling the UE to access the core network includes, when the first source access base station has notified the second source access base station to maintain the connection path between the second source access base station and the core network, establishing a connection path between the target access base station and the core network in accordance with the link access information of the UE, and enabling the UE to access the core network via the connection path between the target access base station and the core network.

In a possible embodiment of the present disclosure, subsequent to enabling the UE to access the core network via the connection path between the target access base station and the core network, the UE path transfer method further includes: notifying a source access base station with a same RAT type as the target access base station to release a connection path between the source access base station and the core network.

In a possible embodiment of the present disclosure, subsequent to establishing the connection with the UE in accordance with the link access information and enabling the UE to access the core network, the UE path transfer method further includes: transmitting reconfiguration information to the UE, the reconfiguration information including UE identification information and a UE-movable region allocated by the target access base station for the UE.

In still yet another aspect, the present disclosure provides in some embodiments a base station, including: a third acquisition module configured to acquire a link connection request from a UE having been switched from a dual-connection state into an inactive state, the dual-connection state of the UE being a state where a communication connection is established between the UE and a first source access base station via a first RAT and a further communication connection is established between the UE and a second source access base station via a second RAT; a fourth acquisition module configured to acquire link access information of the UE in accordance with the link connection request; and a connection module configured to establish a communication connection with the UE in accordance with the link access information, and enable the UE to access a core network.

In a possible embodiment of the present disclosure, the third acquisition module is further configured to acquire the link connection request from the UE having been switched from the dual-connection state into the inactive state via a RRC message. The link connection request includes first UE identification information and second UE identification information from the first source access base station when the UE is in the dual-connection state prior to the inactive state. The first UE identification information is a UE identifier in first RAT link configuration information corresponding to the first source access base station, and the second UE identification information is a UE identifier in second RAT link configuration information corresponding to the second resource access base station and acquired by the first source access base station from the second source access base station.

In still yet another aspect, the present disclosure provides in some embodiments a UE state conversion control method, including: generating a control instruction for controlling a UE to be switched from a dual-connection state into an inactive state, the dual-connection state of the UE being a state where a communication connection is established between the UE and a first source access base station via a first RAT and a further communication connection is established between the UE and a second source access base station via a second RAT; and transmitting the control instruction for controlling the UE to be switched from the dual-connection state into the inactive state to the UE, so as to control the UE to be switched from the dual-connection state into the inactive state in accordance with the control instruction.

In a possible embodiment of the present disclosure, subsequent to generating the control instruction for controlling the UE to be switched from the dual-connection state into the inactive state, the UE state conversion control method further includes: transmitting a notification message for configuring the UE to be in the inactive state to the second source access base station; acquiring second RAT link configuration information transmitted by the second source access base station in accordance with the notification message, the second RAT link configuration information including a second predetermined active region and second UE identification information; and transmitting the second RAT link configuration information and pre-configured first RAT link configuration information to the UE, the first RAT link configuration information including a first predetermined active region and first UE identification information.

In a possible embodiment of the present disclosure, prior to acquiring the second RAT link configuration information transmitted by the second source access base station in accordance with the notification message, the UE state conversion control method further includes transmitting context information of the UE to the second source access base station, so as to acquire the context information of the UE from the second source access base station in accordance with the second UE identification information and transmit the context information of the UE to a target access base station when the second source access base station has received a context acquisition request carrying the second UE identification information from the target access base station.

In a possible embodiment of the present disclosure, subsequent to transmitting the control instruction for controlling the UE to be switched from the dual-connection state into the inactive state to the UE, the UE state conversion control method further includes: acquiring the context acquisition request carrying the first UE identification information from the target access base station; and acquiring the context information of the UE in accordance with the first UE identification information, and transmitting the context information of the UE to the target access base station.

In still yet another aspect, the present disclosure provides in some embodiments a base station, including: a decision module configured to generate a control instruction for controlling a UE to be switched from a dual-connection state into an inactive state, the dual-connection state of the UE being a state where a communication connection is established between the UE and a first source access base station via a first RAT and a further communication connection is established between the UE and a second source access base station via a second RAT; and a first transmission module configured to transmit the control instruction for controlling the UE to be switched from the dual-connection state into the inactive state to the UE, so as to control the UE to be switched from the dual-connection state into the inactive state according to the control instruction.

In a possible embodiment of the present disclosure, the base station further includes: a second transmission module configured to transmit a notification message for configuring the UE to be in the inactive state to the second source access base station; a fifth acquisition module configured to acquire second RAT link configuration information transmitted by the second source access base station in accordance with the notification message, the second RAT link configuration information including a second predetermined active region and second UE identification information; and a third transmission module configured to transmit the second RAT link configuration information and pre-configured first RAT link configuration information to the UE, the first RAT link configuration information including a first predetermined active region and first UE identification information.

In still yet another aspect, the present disclosure provides in some embodiments a UE state conversion control method, including: acquiring a notification message for configuring a UE to be in an inactive state from a first source access base station, the notification message being transmitted after the first source access base station has generated a control instruction for controlling the UE to be switched from a dual-connection state into the inactive state, the dual-connection state being a state where a communication connection is established between the UE and a first source access base station via a first RAT and a further communication connection is established between the UE and a second source access base station via a second RAT; and transmitting second RAT link configuration information to the first source access base station in accordance with the notification message, so as to enable the first source access base station to transmit the second RAT link configuration information and pre-configured first RAT link configuration information to the UE and control the UE to be switched from the dual-connection state into the inactive state, the first RAT link configuration information including a first predetermined active region and first UE identification information, and the second RAT link configuration information including a second predetermined active region and second UE identification information.

In a possible embodiment of the present disclosure, prior to transmitting the second RAT link configuration information to the first source access base station in accordance with the notification message, the UE state conversion control method further includes: acquiring a first notification instruction for controlling the second source access base station to release a connection path between the second source access base station and a core network from the first source access base station, and releasing the connection path between the second source access base station and the core network in accordance with the first notification instruction; or acquiring a second notification instruction for controlling the second source access base station to suspend the connection path between the second source access base station and the core network from the first source access base station, and suspending the connection path between the second source access base station and the core network in accordance with the second notification instruction.

In still yet another aspect, the present disclosure provides in some embodiments a base station, including: a sixth acquisition module configured to acquire a notification message for configuring a UE to be in an inactive state from a first source access base station, the notification message being transmitted after the first source access base station has generated a control instruction for controlling the UE to be switched from a dual-connection state into the inactive state, the dual-connection state being a state where a communication connection is established between the UE and a first source access base station via a first RAT and a further communication connection is established between the UE and a second source access base station via a second RAT; and a fourth transmission module configured to transmit second RAT link configuration information to the first source access base station in accordance with the notification message, so as to enable the first source access base station to transmit the second RAT link configuration information and pre-configured first RAT link configuration information to the UE and control the UE to be switched from the dual-connection state into the inactive state, the first RAT link configuration information including a first predetermined active region and first UE identification information, and the second RAT link configuration information including a second predetermined active region and second UE identification information.

In a possible embodiment of the present disclosure, the base station further includes a seventh acquisition module configured to: acquire a first notification instruction for controlling the second source access base station to release a connection path between the second source access base station and a core network from the first source access base station, and release the connection path between the second source access base station and the core network in accordance with the first notification instruction; or acquire a second notification instruction for controlling the second source access base station to suspend the connection path between the second source access base station and the core network from the first source access base station, and suspend the connection path between the second source access base station and the core network in accordance with the second notification instruction.

In still yet another aspect, the present disclosure provides in some embodiments a UE, including a processor, a memory and a transceiver. The processor is configured to read a program stored in the memory, so as to: acquire, through the transceiver, a control instruction for controlling a UE to be switched from a dual-connection state into an inactive state from a first source access base station communicating with the UE via a first RAT, the dual-connection state of the UE being a state where a communication connection is established between the UE and the first source access base station via the first RAT and a further communication connection is established between the UE and a second source access base station via a second RAT; control the UE to be switched from the dual-connection state into the inactive state in accordance with the control instruction; and transmit, through the transceiver, a link connection request to a target access base station and enable the UE to access a core network via the target access base station when it is detected that the UE in the inactive state is moved. The transceiver is configured to receive and transmit data. The memory is configured to store therein data for the operation of the processor.

In still yet another aspect, the present disclosure provides in some embodiments a base station, including a processor, a memory and a transceiver. The processor is configured to read a program stored in the memory, so as to: acquire, through the transceiver, a link connection request from a UE having been switched from a dual-connection state into an inactive state, the dual-connection state of the UE being a state where a communication connection is established between the UE and a first source access base station via a first RAT and a further communication connection is established between the UE and a second source access base station via a second RAT; acquire link access information of the UE in accordance with the link connection request; and establish a connection with the UE in accordance with the link access information, and enable the UE to access a core network. The transceiver is configured to receive and transmit data. The memory is configured to store therein data for the operation of the processor.

In still yet another aspect, the present disclosure provides in some embodiments a base station, including a processor, a memory and a transceiver. The processor is configured to read a program stored in the memory, so as to: generate a control instruction for controlling a UE to be switched from a dual-connection state into an inactive state, the dual-connection state of the UE being a state where a communication connection is established between the UE and a first source access base station via a first RAT and a further communication connection is established between the UE and a second source access base station via a second RAT; and transmit, through the transceiver, the control instruction for controlling the UE to be switched from the dual-connection state into the inactive state to the UE, so as to control the UE to be switched from the dual-connection state into the inactive state according to the control instruction. The transceiver is configured to receive and transmit data. The memory is configured to store therein data for the operation of the processor.

In still yet another aspect, the present disclosure provides in some embodiments a base station, including a processor, a memory and a transceiver. The processor is configured to read a program stored in the memory, so as to: acquire, through the transceiver, a notification message for configuring a UE to be in an inactive state from a first source access base station, the notification message being transmitted after the first source access base station has generated a control instruction for controlling the UE to be switched from a dual-connection state into the inactive state, the dual-connection state being a state where a communication connection is established between the UE and a first source access base station via a first RAT and a further communication connection is established between the UE and a second source access base station via a second RAT; and transmit, through the transceiver, second RAT link configuration information to the first source access base station in accordance with the notification message, so as to enable the first source access base station to transmit the second RAT link configuration information and pre-configured first RAT link configuration information to the UE and control the UE to be switched from the dual-connection state into the inactive state, the first RAT link configuration information including a first predetermined active region and first UE identification information, and the second RAT link configuration information including a second predetermined active region and second UE identification information. The transceiver is configured to receive and transmit data. The memory is configured to store therein data for the operation of the processor.

According to the embodiments of the present disclosure, the UE may acquire the control instruction for controlling the UE to be switched from the dual-connection state into the inactive state from the first source access base station communicating with the UE via the first RAT, then the UE may be controlled to be switched from the dual-connection state into the inactive state in accordance with the control instruction, and then the UE may transmit the link connection request to the target access base station and access the core network via the target access base station when it is detected that the UE in the inactive state is moved. As a result, it is able to achieve the conversion from the dual-connection state to the inactive state, and transfer the connection path for the UE in the inactive state without parts of authentication processes at the core network, thereby to remarkably reduce an access time for the UE and improve the network efficiency.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

FIG. 11 is a flow chart of a UE state conversion control method according to some embodiments of the present disclosure;

FIG. 12 is a block diagram of another base station according to some embodiments of the present disclosure;

FIG. 13 is a flow chart of another UE state conversion control method according to some embodiments of the present disclosure;

FIG. 14 is a block diagram of yet another base station according to some embodiments of the present disclosure;

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide a UE path transfer method, a UE state conversion control method, a UE and a base station, so as to achieve the conversion of the UE state and transfer a path when the UE is served by base stations of two communication systems simultaneously.

Figure 1:
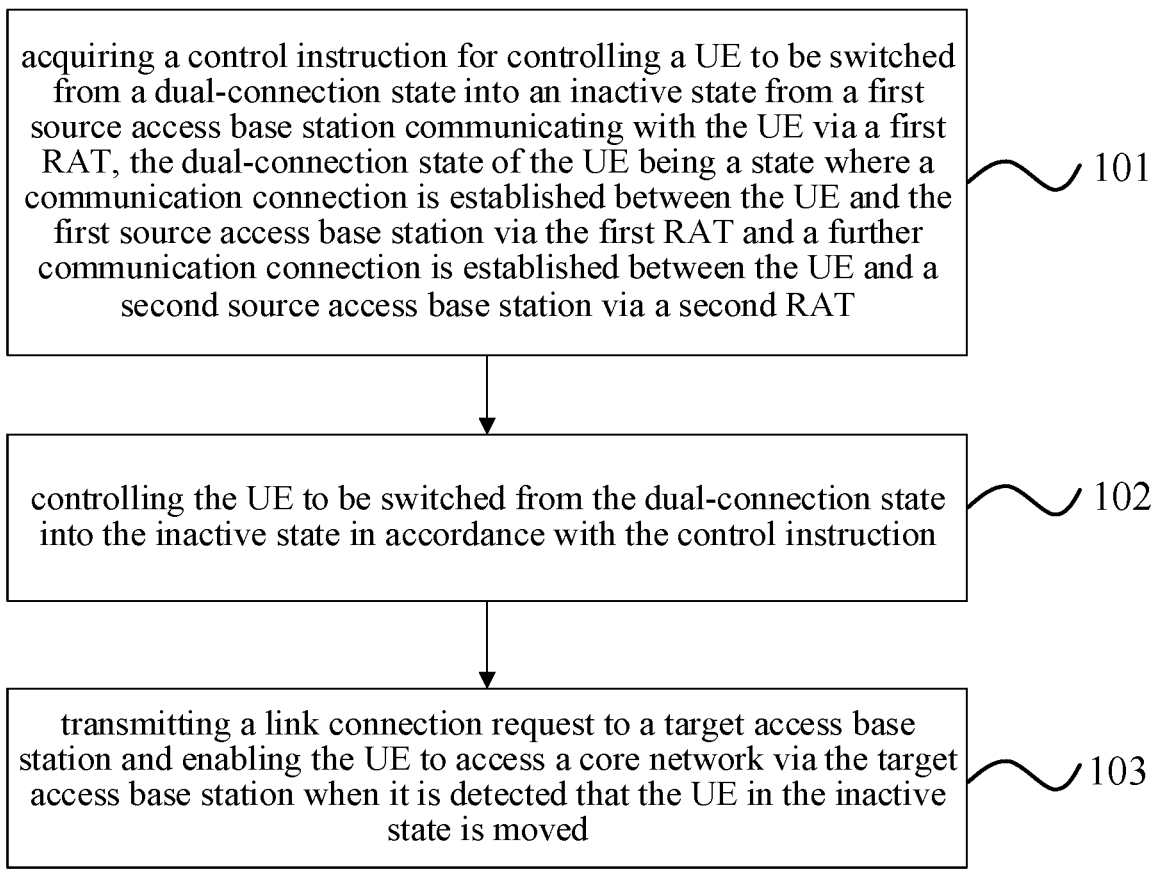
FIG. 1 is a flow chart of a UE path transfer method according to some embodiments of the present disclosure.

The present disclosure provides in some embodiments a UE path transfer method for use in a UE which, as shown in FIG. 1, includes the following steps.

Step 101: acquiring a control instruction for controlling the UE to be switched from a dual-connection state into an inactive state from a first source access base station communicating with the UE via a first RAT, the dual-connection state of the UE being a state where a communication connection is established between the UE and the first source access base station via the first RAT and a further communication connection is established between the UE and a second source access base station via a second RAT.

Herein, the first source access base station may be a primary base station and the second source access base station may be a secondary base station. The first source access base station and the second source access base station may be respective base stations in different radio access systems. For example, the first source access base station may be a base station in the 5G mobile communication system (i.e., a 5G base station) while the second source access base station may be an evolved Node B (eNB), or the first source access base station may be the eNB while the second source access base station may be the 5G base station.

The first source access base station and the second source access base station are configured to provide services to the UE simultaneously. When some services for the UE have been completed and there is not too much data transmission for the UE, the first source access base station may make a decision to enable the UE to be in the inactive state, and transmit to the UE the control instruction for controlling the UE to be switched from the dual-connection state into the inactive state.

Step 102: controlling the UE to be switched from the dual-connection state into the inactive state in accordance with the control instruction.

Upon the receipt of the control instruction, the UE may be switched from the dual-connection state into the inactive state.

Step 103: transmitting a link connection request to a target access base station and enabling the UE to access a core network via the target access base station when it is detected that the UE in the inactive state is moved.

In the embodiments of the present disclosure, the UE has different UE identification information with respect to different RATs. When the UE in the inactive state is moved and the UE identification information changes during the movement, the UE may transmit the link connection request in accordance with RAT configuration information. To be specific, the link connection request may be a link recovery request or a paging reception request.

According to the UE path transfer method in the embodiments of the present disclosure, the UE may acquire the control instruction for controlling the UE to be switched from the dual-connection state into the inactive state from the first source access base station communicating with the UE via the first RAT, then the UE may be controlled to be switched from the dual-connection state into the inactive state in accordance with the control instruction, and then the UE may transmit the link connection request to the target access base station and access the core network via the target access base station when it is detected that the UE in the inactive state is moved. As a result, it is able to achieve the conversion of the UE from the dual-connection state to the inactive state, and transfer the path for the UE in the inactive state without parts of authentication processes at the core network, thereby to remarkably reduce an access time for the UE and improve the network efficiency.

Figure 2:
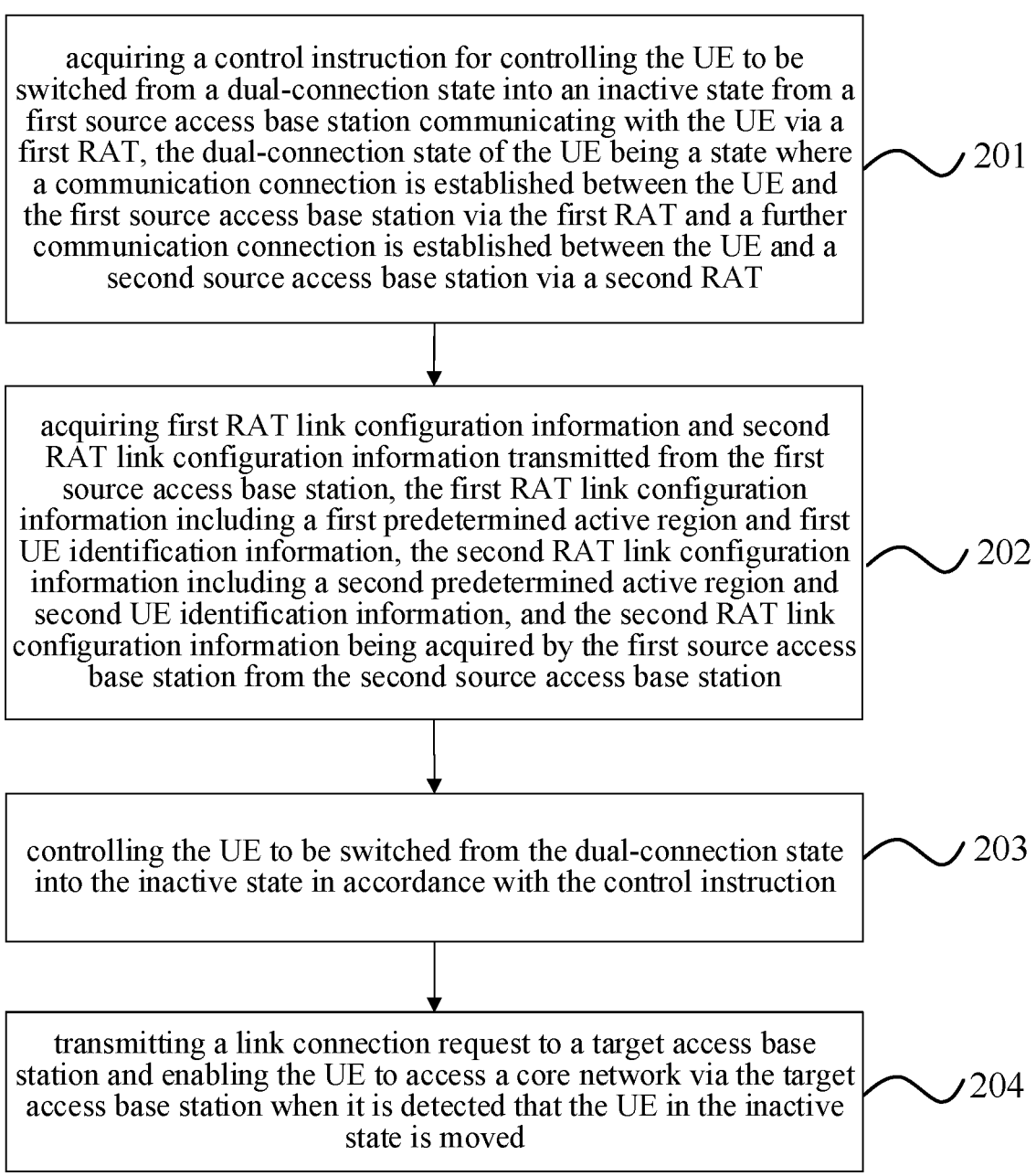
FIG. 2 is a flow chart of another UE path transfer method according to some embodiments of the present disclosure.

The present disclosure further provides in some embodiments a UE state transfer method for use in a UE which, as shown in FIG. 2, includes the following steps.

Step 201: acquiring a control instruction for controlling the UE to be switched from a dual-connection state into an inactive state from a first source access base station communicating with the UE via a first RAT, the dual-connection state of the UE being a state where a communication connection is established between the UE and the first source access base station via the first RAT and a further communication connection is established between the UE and a second source access base station via a second RAT.

Herein, the first source access base station may be a primary base station and the second source access base station may be a secondary base station. The first source access base station and the second source access base station may be respective base stations in different radio access systems. For example, the first source access base station may be a 5G base station while the second source access base station may be an eNB, or the first source access base station may be the eNB while the second source access base station may be the 5G base station.

The first source access base station and the second source access base station are configured to provide services to the UE simultaneously. When some services for the UE have been completed and there is not too much data transmission for the UE, the first source access base station may make a decision to enable the UE to be in the inactive state, and transmit to the UE the control instruction for controlling the UE to be switched from the dual-connection state into the inactive state.

Step 202: acquiring first RAT link configuration information and second RAT link configuration information transmitted from the first source access base station. The first RAT link configuration information may include a first predetermined active region and first UE identification information, and the second RAT link configuration information may include a second predetermined active region and second UE identification information. The second RAT link configuration information may be acquired by the first source access base station from the second source access base station.

Herein, the first RAT link configuration information is link information configured for the UE after the first source access base station has made the decision to enable the UE to be in the inactive state. The first UE identification information is identification information adopted by the UE in the first RAT.

The first source access base station may transmit a notification message for configuring the UE to be in the inactive state to the second source access base station after the first source access base station has made the decision to enable the UE to be in the inactive state, and acquire the second RAT link configuration information transmitted by the second source access base station in response to the notification message. The second UE identification information is the identification information adopted by the UE in the second RAT.

Step 203: controlling the UE to be switched from the dual-connection state into the inactive state in accordance with the control instruction.

Upon the receipt of the control instruction, the UE may be switched from the dual-connection state into the inactive state.

Step 204: transmitting a link connection request to a target access base station and enabling the UE to access a core network via the target access base station when it is detected that the UE in the inactive state is moved.

To be specific, the link connection request may be transmitted to the target access base station via a RRC message, and the UE may access the core network via the target access base station. The first UE identification information and/or the second UE identification information may be carried in the RRC message. In this way, the target access base station may acquire context information of the UE in accordance with the corresponding UE identification information, and thereby establish the connection with the UE and the core network in accordance with the context information.

In the embodiments of the present disclosure, when the UE is moved in the predetermined active region (i.e., the above-mentioned first predetermined active region and second predetermined active region) and the RAT has changed, the paging reception or the link recovery may be performed in accordance with the corresponding RAT link configuration information. When the UE has been moved out of the predetermined active region (i.e., the above-mentioned first predetermined active region and second predetermined active region), the link recovery may be performed in accordance with the corresponding RAT link configuration information.

In a possible embodiment of the present disclosure, Step 204 may include: when it is detected that the UE in the inactive state is moved from the first predetermined active region to the second predetermined active region or is moved out of each of the first predetermined active region and the second predetermined active region, transmitting the link connection request to the target access base station, and enabling the UE to access the core network via the target access base station.

When the UE is moved from the first predetermined active region to the second predetermined active region, i.e., the UE is moved in the predetermined active region but the RAT changes, the UE may transmit the link connection request to the target access base station. When the UE is moved in the first predetermined active region or the second predetermined active region, it is unnecessary for the UE to update its position through handover.

In a possible embodiment of the present disclosure, in Step 204, the target access base station is the second source access base station. The transmitting the link connection request to the target access base station and enabling the UE to access the core network via the target access base station includes: transmitting the link connection request carrying the second UE identification information and the first UE identification information to the second source access base station; and recovering the communication connection between the UE and the second source access base station in accordance with the first UE identification information or the second UE identification information, and enabling the UE to access the core network via the second source access base station. The link connection request may further carry RAT type information of the source access base station previously connected to the UE before the UE has entered the inactive state, so that the target access base station may accurately determine the source access base station previously connected to the UE in accordance with the RAT type information and the UE identification information.

When the first source access base station has made a decision to enable the UE to be in the inactive state, the first source access base station may notify the second source access base station to release or suspend the connection path to the core network. When the target access base station for the UE is the second source access base station, the second source access base station may determine the first source access base station previously connected to the UE before the UE has entered the inactive state in accordance with the first UE identification information reported by the UE and the RAT type information of the source access base station previously connected to the UE, acquire the context information of the UE from the first source access base station in accordance with the first UE identification information, perform a link recovery operation, and notify the first source access base station to release the UE.

In addition, when the first source access base station has made a decision to enable the UE to be in the inactive state, the first source access base station may transmit the entire context information of the UE to the second source access base station for storage therein, and notify the second source access base station to release or suspend the connection path to the core network. When the target access base station for the UE is the second source access base station, the second source access base station may acquire the context information of the UE from the second source access base station according to the second UE identification information reported by the UE, perform the link recovery operation, and notify the first source access base station to release the UE.

In a possible embodiment of the present disclosure, in Step 204, the target access base station is a base station other than the first source access base station and the second source access base station. The transmitting the link connection request to the target access base station and enabling the UE to access the core network via the target access base station includes: transmitting the link connection request carrying the first UE identification information and the second UE identification information to the target access base station; and establishing a communication connection between the UE and the target access base station in accordance with the first UE identification information or the second UE identification information, and enabling the UE to access the core network via the target access base station. The link connection request may further carry RAT type information of the source access base station previously connected to the UE before the UE has entered the inactive state, so that the target access base station may accurately determine the source access base station previously connected to the UE in accordance with the RAT type information and the UE identification information.

Herein, when the context information of the UE are stored in both the first source access base station and the second source access base station, the context information of the UE may be acquired from the first source access base station in accordance with the first UE identification information, and the UE may establish the connection to the target access base station and access the core network via the target access base station; or the context information of the UE may be acquired from the second source access base station in accordance with the second UE identification information, and the UE may establish the connection to the target access base station and access the core network via the target access base station.

When the context information of the UE is merely stored in the first source access base station rather than the second source access base station, the context information of the UE may be acquired from the first source access base station in accordance with the first UE identification information, and the UE may establish the connection to the target access base station and access the core network via the target access base station.

When the context information of the UE is merely stored in the second source access base station rather than the first source access base station, the context information of the UE may be acquired from the second source access base station in accordance with the second UE identification information, and the UE may establish the connection to the target access base station and access the core network via the target access base station.

In a possible embodiment of the present disclosure, subsequent to, when it is detected that the UE in the inactive state is moved, transmitting the link connection request to the target access base station and enabling the UE to access the core network via the target access base station, the UE path transfer method further includes acquiring reconfiguration information from the target access base station. The reconfiguration information may include UE identification information and a UE-movable region allocated by the target access base station for the UE.

Herein, upon the receipt of the reconfiguration information from the target access base station, the UE may perform the subsequent operations in accordance with the reconfiguration information.

According to the UE path transfer method in the embodiments of the present disclosure, when the UE is in the dual-connection state and the UE needs to be switched to be in the inactive state, the UE may be notified to be in the inactive state, the link configuration information corresponding to different RATs may be configured, and the link configuration information corresponding to each RAT may include the predetermined active region and the UE identification information. When the UE is moved in the predetermined active regions, it is unnecessary to update its position through handover. When data is to be transmitted, it is able to perform the access procedure or the configuration recovery procedure in accordance with the preconfigured UE identification information. As a result, it is able to achieve the path transfer of the UE in the inactive state without parts of authentication processes at the core network, thereby to remarkably reduce an access time for the UE and improve the network efficiency.

An interactive process among the UE, the first source access base station and the second source access base station will be described hereinafter in conjunction with FIG. 3.

In the embodiments of the present disclosure, the first source access base station is in communication connection with the UE through the first RAT, the second source access base station is in communication connection with the UE through the second RAT, and the first source access base station is connected to the second source access base station.

Figure 3:
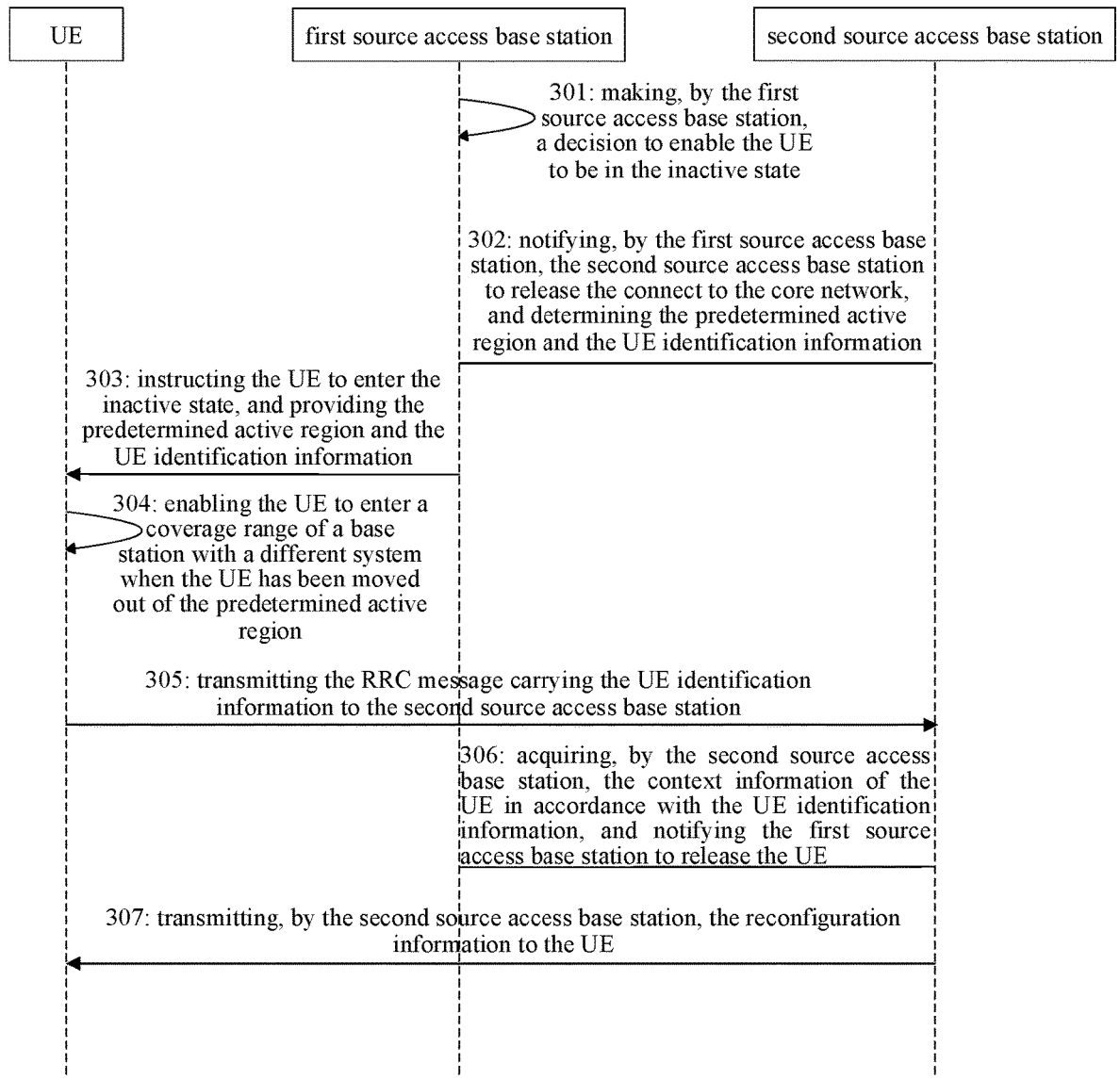
FIG. 3 is a flow chart of yet another UE path transfer method according to some embodiments of the present disclosure.

As shown in FIG. 3, the interactive process may include the following steps.

Step 301: making, by the first source access base station, a decision to enable the UE to be in the inactive state.

Step 302: notifying, by the first source access base station, the second source access base station to release the connect to the core network, and determining the predetermined active region and the UE identification information.

Herein, the predetermined active region may include the first predetermined active region configured by the first source access base station and the second predetermined active region configured by the second source access base station. The UE identification information may include the first UE identification information configured by the first source access base station and the second UE identification information configured by the second source access base station.

In Step 302, in a possible embodiment of the present disclosure, the first source access base station may provide the context information of the UE to the second source access base station.

Step 303: instructing the UE to enter the inactive state, and providing the predetermined active region and the UE identification information.

Step 304: enabling the UE to enter a coverage range of a base station with a different system when the UE has been moved out of the predetermined active region. In FIG. 3, the second source access base station serves as the base station with the different system.

Step 305: transmitting the RRC message carrying the UE identification information to the second source access base station.

Step 306: acquiring, by the second source access base station, the context information of the UE in accordance with the UE identification information, and notifying the first source access base station to release the UE.

When the context information of the UE is stored in the second source access base station, the context information of the UE may be acquired in accordance with the second UE identification information, and otherwise, the context information of the UE may be acquired from the second source access base station in accordance with the first UE identification information.

Step 307: transmitting, by the second source access base station, the reconfiguration information to the UE.

At this time, the UE path transfer has been completed when the UE is in the inactive state. During the cross-system path transfer, it is unnecessary to perform parts of authentication processes at the core network, so it is able to remarkably reduce an access time for the UE.

Several application scenarios for the UE path transfer method will be described hereinafter illustratively.

In one application scenario, the first source access base station may be an eNB and the second source access base station may be a 5G base station. The eNB may be a primary base station, the 5G base station may be a secondary base station. The UE may be served by the two base stations simultaneously.

Figure 4:
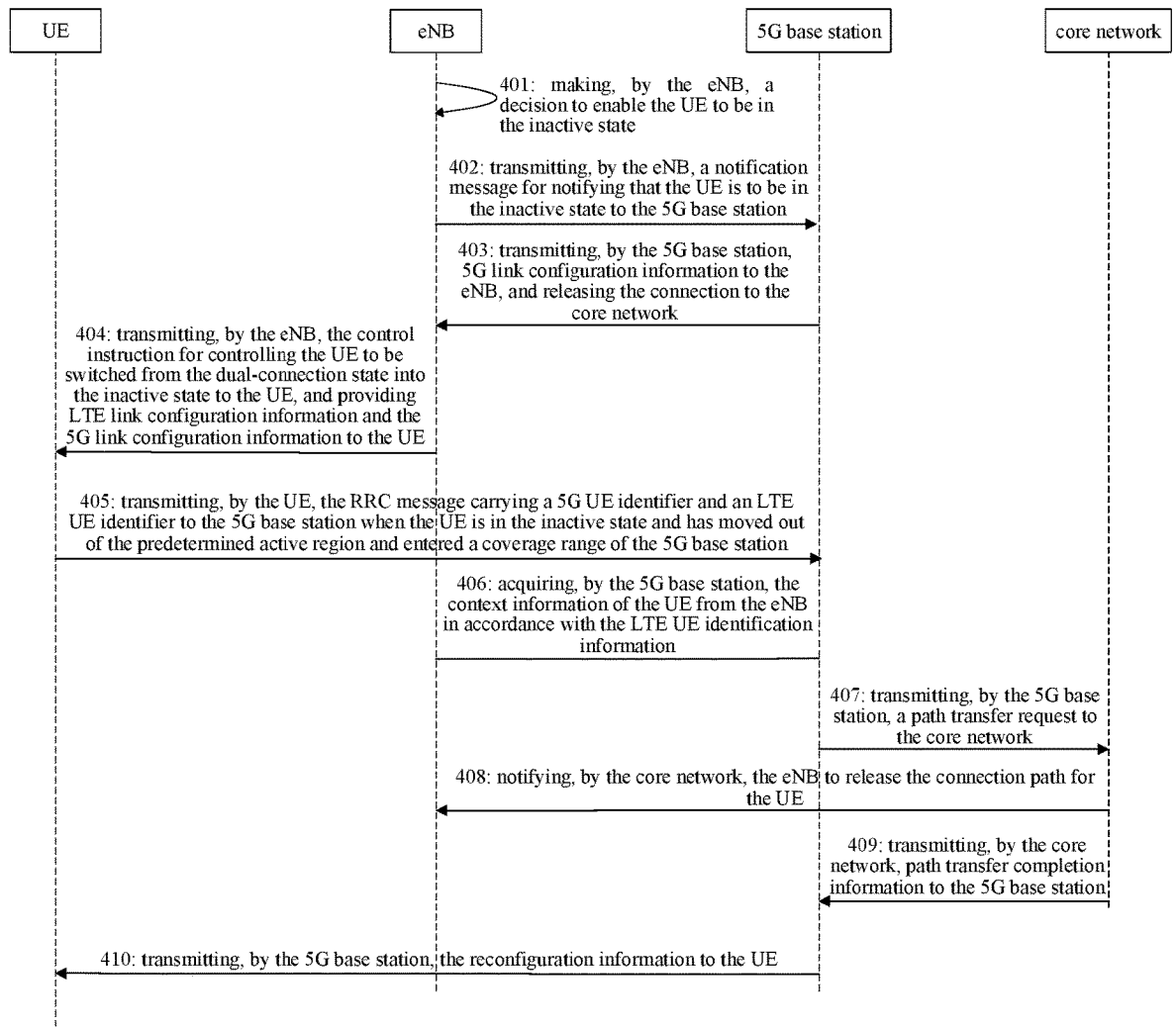
FIG. 4 is a flow chart of a UE path transfer method application scenario according to some embodiments of the present disclosure.

As shown in FIG. 4, the UE path transfer method may include the following steps.

Step 401: making, by the eNB, a decision to enable the UE to be in the inactive state.

Step 402: transmitting, by the eNB, a notification message for notifying that the UE is to be in the inactive state to the 5G base station.

Step 403: transmitting, by the 5G base station, 5G link configuration information to the eNB, and releasing the connection to the core network.

The 5G link configuration information may include 5G UE identification information and the second predetermined active region.

When some services for the UE have been completed and there is not too much data transmission for the UE, the eNB may make a decision to enable the UE to be in the inactive state. At this time, the eNB may negotiate with the 5G base station so as to determine whether the UE is allowed to perform the link recovery at the 5G base station. When the UE is allowed to perform the link recovery at the 5G base station, the 5G base station may provide information such as an inactive UE ID of the UE and a relevant active region in the RAT, and release the connection to the core network.

Step 404: transmitting, by the eNB, the control instruction for controlling the UE to be switched from the dual-connection state into the inactive state to the UE, and providing LTE link configuration information and the 5G link configuration information to the UE.

The LTE link configuration information may include LTE UE identification information and the first predetermined active region. Herein, the UE may be notified to be in the inactive state through RRC signaling, and the inactive UE IDs and the active regions for multiple RATs may be provided.

Step 405: transmitting, by the UE, the RRC message carrying a 5G UE identifier and an LTE UE identifier to the 5G base station when the UE is in the inactive state and has moved out of the predetermined active region and entered a coverage range of the 5G base station.

Herein, when the UE has been moved out of the predetermined region, it means that the UE has been moved out of the first predetermined active region and the second predetermined active region.

In addition, upon the receipt of the control instruction, the UE may be in the inactive state, and the relevant configuration information may be reserved. When the UE is moved into the active region of another RAT within the predetermined active region, the UE may perform the paging reception or the uplink recovery in accordance with the corresponding RAT configuration information. When the UE is moved out of the predetermined active region and enters the active region of another RAT, the UE may initiate a RRC connection establishment request, or a position update request message, or a RRC connection recovery request message, or the like in the corresponding RAT, and at least the inactive UE ID adopted in the RAT may be carried in the request message, or both the inactive UE ID of a source RAT and the RAT type information may be reported simultaneously.

Step 406: acquiring, by the 5G base station, the context information of the UE from the eNB in accordance with the LTE UE identification information.

Upon the receipt of the UE identification information, the 5G base station may determine the source access base station previously connected to the UE in accordance with the UE identification information, and then transmit a request for acquiring the context information of the UE to the source access base station. It should be appreciated that, the 5G base station here is not necessarily the 5G base station to which the UE accessed previously.

Step 407: transmitting, by the 5G base station, a path transfer request to the core network.

Upon the receipt of a response message from the source access base station, the 5G base station may perform the path transfer to the core network in accordance with the acquired context information of the UE, such that the path is transferred to the 5G base station.

Step 408: notifying, by the core network, the eNB to release the connection path for the UE.

Step 409: transmitting, by the core network, path transfer completion information to the 5G base station.

Step 410: transmitting, by the 5G base station, the reconfiguration information to the UE.

In this application scenario, after the UE has been reconfigured, when there is still data to be transmitted by the 5G base station, the UE may be maintained in a connected state. When there is no data to be transmitted by the 5G base station, the UE may be in the inactive state, and a new inactive UE ID may be allocated for the UE.

In another application scenario, the first source access base station may be a 5G base station and the second source access base station may be an eNB. The 5G base station may be a primary base station, the eNB may be a secondary base station, and the UE may be served by the two base stations simultaneously.

Figure 5:
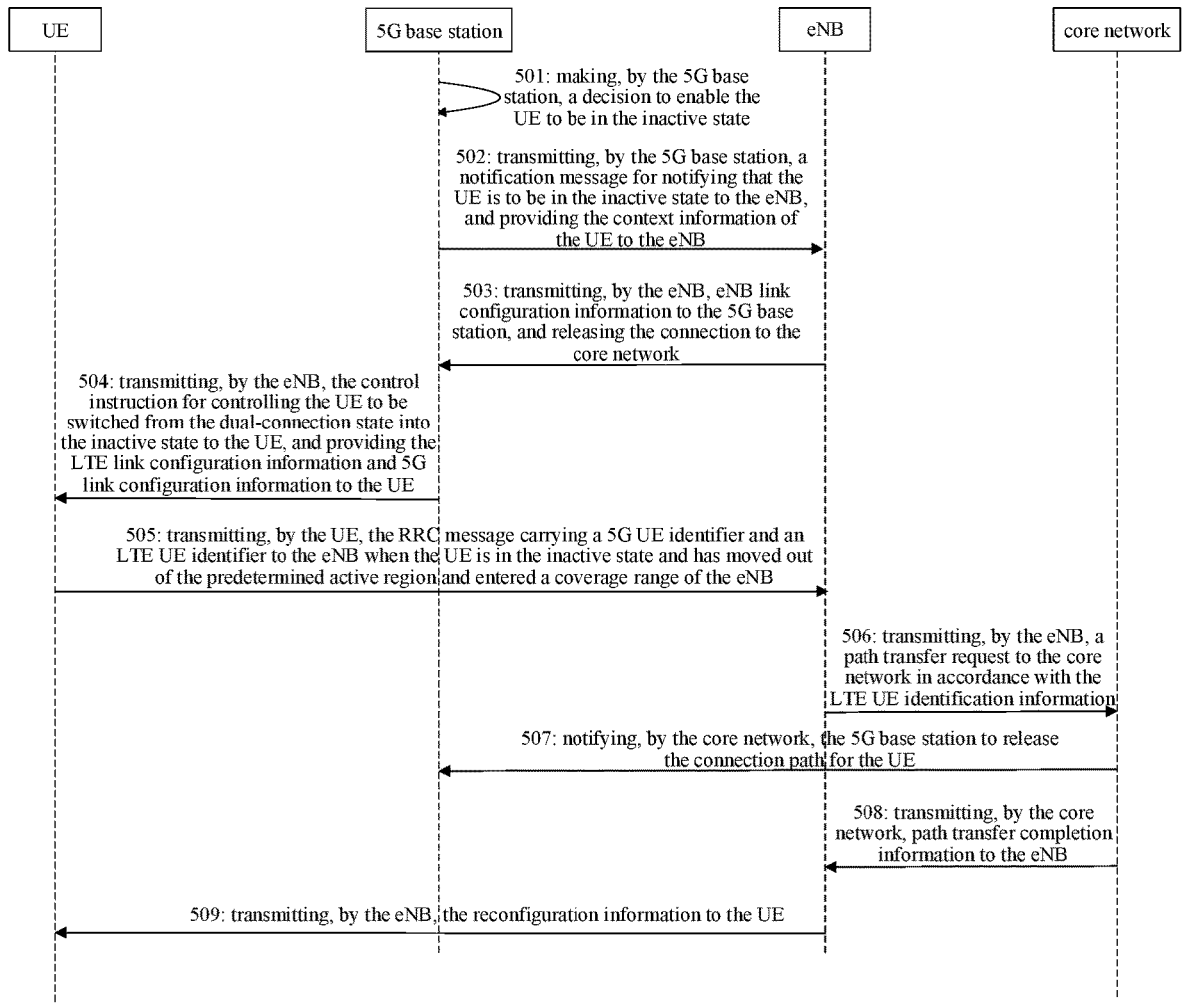
FIG. 5 is a flow chart of another UE path transfer method application scenario according to some embodiments of the present disclosure.

As shown in FIG. 5, the UE path transfer method may include the following steps.

Step 501: making, by the 5G base station, a decision to enable the UE to be in the inactive state.

Step 502: transmitting, by the 5G base station, a notification message for notifying that the UE is to be in the inactive state to the eNB, and providing the context information of the UE to the eNB.

Step 503: transmitting, by the eNB, eNB link configuration information to the 5G base station, and releasing the connection to the core network.

The LTE link configuration information may include LTE UE identification information and the second predetermined active region.

When some services for the UE have been completed and there is not too much data transmission for the UE, the 5G base station may make a decision to enable the UE to be in the inactive state. At this time, the eNB may provide information such as an inactive UE ID used by the UE and a relevant active region in the RAT via an inter-system interface, and release the connection to the core network.

Step 504: transmitting, by the eNB, the control instruction for controlling the UE to be switched from the dual-connection state into the inactive state to the UE, and providing the LTE link configuration information and 5G link configuration information to the UE.

The 5G link configuration information may include 5G UE identification information and the first predetermined active region. Herein, the UE may be notified to be in the inactive state through RRC signaling, and the inactive UE IDs and the active regions for multiple RATs may be provided.

Step 505: transmitting, by the UE, the RRC message carrying a 5G UE identifier and an LTE UE identifier to the eNB when the UE is in the inactive state and has moved out of the predetermined active region and entered into in a coverage range of the eNB.

Herein, when the UE has been moved out of the predetermined region, it means that the UE has been moved out of the first predetermined active region and the second predetermined active region.

In addition, upon the receipt of the control instruction, the UE may be in the inactive state, and the relevant configuration information may be reserved. When the UE is moved into the active region of another RAT within the predetermined active region, the UE may perform the paging reception or the uplink recovery in accordance with the corresponding RAT configuration information. When the UE is moved out of the predetermined active region and enters the active region of another RAT, the UE may initiate a RRC connection establishment request, or a position update request message or a RRC connection recovery request message in the corresponding RAT or the like, and at least the inactive UE ID adopted in the RAT may be carried in the request message, or the inactive UE ID of a source RAT and the RAT type information may be reported simultaneously.

Step 506: transmitting, by the eNB, a path transfer request to the core network in accordance with the LTE UE identification information.

Upon the receipt of the UE identification information, the eNB may perform the path transfer to the core network in accordance with the context information of the UE stored in the eNB. It should be appreciated that, the eNB here is not necessarily the eNB to which the UE accessed previously.

Step 507: notifying, by the core network, the 5G base station to release the connection path for the UE.

Step 508: transmitting, by the core network, path transfer completion information to the eNB.

Step 509: transmitting, by the eNB, the reconfiguration information to the UE.

In this application scenario, after the UE has been reconfigured, when there is still data to be transmitted by the eNB, the UE may be maintained in the connected state. When there is no data to be transmitted by the eNB, the UE may be in the inactive state, and a new inactive UE ID may be allocated for the UE.

In the application scenarios in FIGS. 4 and 5, when the UE has been moved out of the original coverage range, the base station to which the UE accesses is not necessarily the base station which served as the secondary base station previously. In other words, the base stations in FIGS. 4 and 5 are merely for illustrative purposes, and each of the base stations may be one in another system. When a base station to which the UE accesses is not the original secondary base station, the base station needs to acquire the context information of the UE from the original master or secondary base station through a UE context fetching procedure, and then recover the connection to the UE.

In yet another application scenario, the secondary base station may suspend the connection to the core network, different from the application scenario 1 in FIG. 4 and the application scenario 2 in FIG. 5 where the secondary base station does not release the connection to the core network. When the UE needs to be connected to the core network, it may communicate with the core network and recover the suspended connection. In this case, it is unnecessary to perform the path transfer, and instead, the path between the original primary base station and the core network may be suspended and the path between the current RAT and the core network may be recovered.

In this application scenario, the first source access base station may be a 5G base station and the second source access base station may be an eNB. The 5G base station may be a primary base station, the eNB may be a slave primary base station, and the UE may be served by the two base stations simultaneously.

Figure 6:
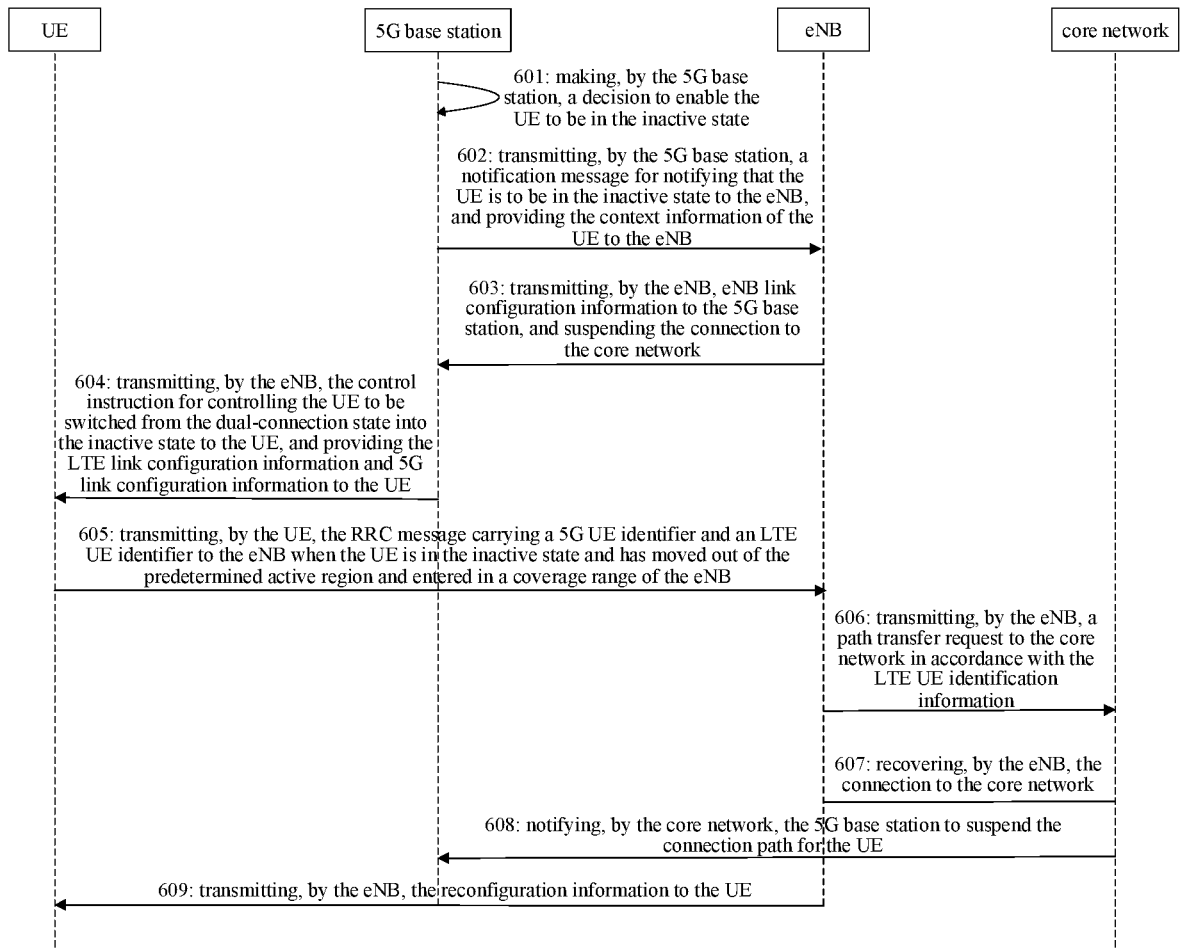
FIG. 6 is a flow chart of still another UE path transfer method application scenario according to some embodiments of the present disclosure.

As shown in FIG. 6, the UE path transfer method may include the following steps.

Step 601: making, by the 5G base station, a decision to enable the UE to be in the inactive state.

Step 602: transmitting, by the 5G base station, a notification message for notifying that the UE is to be in the inactive state to the eNB, and providing the context information of the UE to the eNB.

Step 603: transmitting, by the eNB, eNB link configuration information to the 5G base station, and suspending the connection to the core network.

The LTE link configuration information may include LTE UE identification information and the second predetermined active region.

When some services for the UE have been completed and there is not too much data transmission for the UE, the 5G base station may make a decision to enable the UE to be in the inactive state. At this time, the eNB may provide information such as an inactive UE ID of the UE and a relevant active region in the RAT via an inter-system interface, and release the connection to the core network.

Step 604: transmitting, by the eNB, the control instruction for controlling the UE to be switched from the dual-connection state into the inactive state to the UE, and providing the LTE link configuration information and 5G link configuration information to the UE.

The 5G link configuration information may include 5G UE identification information and the first predetermined active region. Herein, the UE may be notified to be in the inactive state through RRC signaling, and the inactive UE IDs and the active regions for multiple RATs may be provided.

Step 605: transmitting, by the UE, the RRC message carrying a 5G UE identifier and an LTE UE identifier to the eNB when the UE is in the inactive state and has moved out of the predetermined active region and entered into a coverage range of the eNB.

Herein, when the UE has been moved out of the predetermined region, it means that the UE has been moved out of the first predetermined active region and the second predetermined active region.

In addition, upon the receipt of the control instruction, the UE may be in the inactive state, and the relevant configuration information may be reserved. When the UE is moved into the active region of another RAT within the predetermined active region, the UE may perform the paging reception or the uplink recovery in accordance with the corresponding RAT configuration information. When the UE is moved out of the predetermined active region and enters the active region of another RAT, the UE may initiate a RRC connection establishment request, a position update request message or a RRC connection recovery request message in the corresponding RAT, and at least the inactive UE ID adopted in the RAT may be carried in the request message, or the inactive UE ID of a source RAT and the RAT type information may also be reported simultaneously.

Step 606: transmitting, by the eNB, a path transfer request to the core network in accordance with the LTE UE identification information.

Upon the receipt of the UE identification information, the eNB may perform the path transfer to the core network in accordance with the context information of the UE stored in the eNB. It should be appreciated that, the eNB here is not necessarily the eNB to which the UE accessed previously.

Step 607: recovering, by the eNB, the connection to the core network.

Step 608: notifying, by the core network, the 5G base station to suspend the connection path for the UE.

Step 609: transmitting, by the eNB, the reconfiguration information to the UE.

In this application scenario, after the UE has been reconfigured, when there is still data to be transmitted by the eNB, the UE may be maintained in the connected state. When there is no data to be transmitted by the eNB, the UE may be in the inactive state, and a new inactive UE ID may be allocated for the UE.

In still yet another application scenario, when the primary base station has made a decision to enable the UE to be in the inactive state, it may provide multiple RATs-related configuration information to the UE. The context information of the UE may be stored in both the primary base station and the secondary base station, and the UE may perform the data transmission or paging monitoring in any RAT within the predetermined active region any time. When the UE has moved out of the predetermined active region, the UE may access in any RAT and perform the link reconfiguration. During this procedure, the UE identification information in two RATs may be provided by the UE.

The UE may be served by a first RAT primary base station and a second RAT secondary base station simultaneously.

Figure 7:
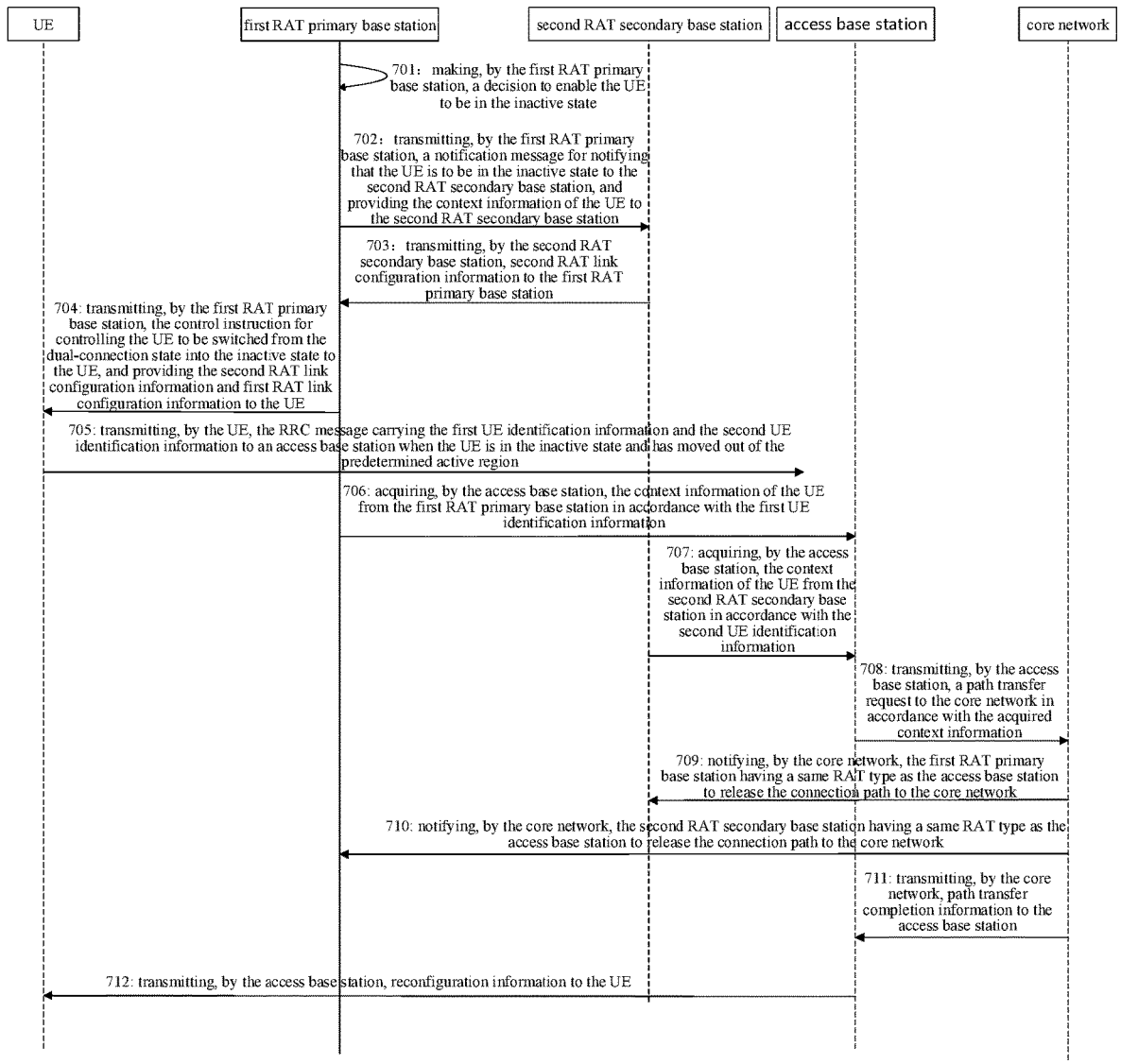
FIG. 7 is a flow chart of still yet another UE path transfer method application scenario according to some embodiments of the present disclosure.

As shown in FIG. 7, the interactive process may include the following steps.

Step 701: making, by the first RAT primary base station, a decision to enable the UE to be in the inactive state.

Step 702: transmitting, by the first RAT primary base station, a notification message for notifying that the UE is to be in the inactive state to the second RAT secondary base station, and providing the context information of the UE to the second RAT secondary base station.

Step 703: transmitting, by the second RAT secondary base station, second RAT link configuration information to the first RAT primary base station. The second RAT link configuration information may include second UE identification information and the second predetermined active region corresponding to the second RAT.

Step 704: transmitting, by the first RAT primary base station, the control instruction for controlling the UE to be switched from the dual-connection state into the inactive state to the UE, and providing the second RAT link configuration information and first RAT link configuration information to the UE. The first RAT link configuration information may include first UE identification information and a first predetermined active region corresponding to the first RAT.

Herein, the context information of the UE may be stored in the two base stations, so as to rapidly recover resources for the UE in a corresponding system, thereby to shorten an access time for the UE.

Step 705: transmitting, by the UE, the RRC message carrying the first UE identification information and the second UE identification information to an access base station when the UE is in the inactive state and has moved out of the predetermined active region.

Step 706: acquiring, by the access base station, the context information of the UE from the first RAT primary base station in accordance with the first UE identification information, or Step 707: acquiring, by the access base station, the context information of the UE from the second RAT secondary base station in accordance with the second UE identification information.

Step 708: transmitting, by the access base station, a path transfer request to the core network in accordance with the acquired context information.

Step 709: notifying, by the core network, the first RAT primary base station having a same RAT type as the access base station to release the connection path to the core network, or Step 710: notifying, by the core network, the second RAT secondary base station having a same RAT type as the access base station to release the connection path to the core network.

Step 711: transmitting, by the core network, path transfer completion information to the access base station.

Step 712: transmitting, by the access base station, reconfiguration information to the UE.

In the above application scenarios, when the UE has accessed the core network through one RAT and the network side has made a decision to enable the UE to be in the connected state, it is necessary to instruct another base station to release the UE-related connection or release the relevant context information of the UE.

According to the embodiments of the present disclosure, the UE may acquire the control instruction for controlling the UE to be switched from the dual-connection state into the inactive state from the first source access base station communicating with the UE via the first RAT, then the UE may be controlled to be switched from the dual-connection state into the inactive state in accordance with the control instruction, and then the UE may transmit the link connection request to the target access base station and access the core network via the target access base station when it is detected that the UE in the inactive state is moved. As a result, it is able to achieve the conversion of the UE from the dual-connection state to the inactive state, and transfer the connection path for the UE in the inactive state without parts of authentication processes at the core network, thereby to remarkably reduce an access time for the UE and improve the network efficiency.

Figure 8:
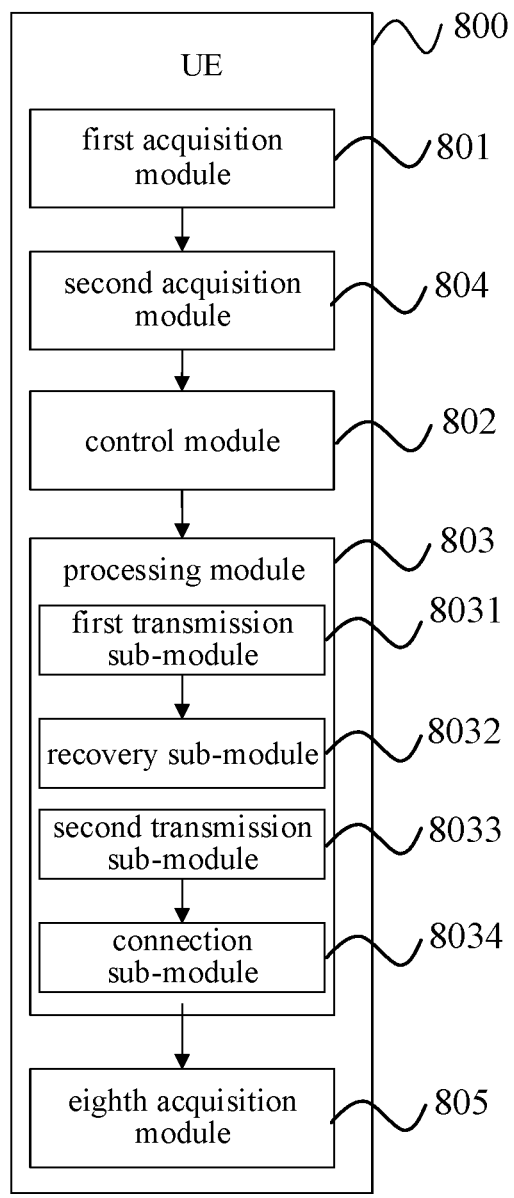
FIG. 8 is a block diagram of a UE according to some embodiments of the present disclosure.

The present disclosure further provides in some embodiments a UE 800 which, as shown in FIG. 8, includes: a first acquisition module 801 configured to acquire a control instruction for controlling a UE to be switched from a dual-connection state into an inactive state from a first source access base station communicating with the UE via a first RAT, the dual-connection state of the UE being a state where a communication connection is established between the UE and the first source access base station via the first RAT and a further communication connection is established between the UE and a second source access base station via a second RAT; a control module 802 configured to control the UE to be switched from the dual-connection state into the inactive state in accordance with the control instruction; and a processing module 803 configured to transmit a link connection request to a target access base station and enable the UE to access a core network via the target access base station when it is detected that the UE in the inactive state is moved.

In a possible embodiment of the present disclosure, the UE further includes a second acquisition module 804 configured to acquire first RAT link configuration information and a second RAT link configuration information from the first source access base station. The first RAT link configuration information includes a first predetermined active region and first UE identification information, and the second RAT link configuration information includes a second predetermined active region and second UE identification information. The second RAT link configuration information is acquired by the first source access base station from the second source access base station.

In a possible embodiment of the present disclosure, the processing module 803 is further configured to transmit the link connection request to the target access base station via a RRC message, and enable the UE to access the core network via the target access base station. The first UE identification information and/or the second UE identification information may be carried in the RRC message.

In a possible embodiment of the present disclosure, the processing module 803 is further configured to: when it is detected that the UE in the inactive state is moved from the first predetermined active region to the second predetermined active region or is moved out of each of the first predetermined active region and the second predetermined active region, transmit the link connection request to the target access base station, and enable the UE to access the core network via the target access base station.

In a possible embodiment of the present disclosure, the target access base station is the second source access base station. The processing module 803 includes: a first transmission sub-module 8031 configured to transmit the link connection request carrying the second UE identification information and the first UE identification information to the second source access base station; and a recovery sub-module 8032 configured to recover the communication connection between the UE and the second source access base station in accordance with the first UE identification information or the second UE identification information, and enable the UE to access the core network via the second source access base station.

In a possible embodiment of the present disclosure, the target access base station is a base station other than the first source access base station and the second source access base station. The processing module 803 includes: a second transmission sub-module 8033 configured to transmit the link connection request carrying the first UE identification information and the second UE identification information to the target access base station; and a connection sub-module 8034 configured to establish a communication connection between the UE and the target access base station in accordance with the first UE identification information or the second UE identification information, and enable the UE to access the core network via the target access base station.

In a possible embodiment of the present disclosure, the UE further includes an eighth acquisition module 805 configured to acquire reconfiguration information from the target access base station. The reconfiguration information may include UE identification information and a UE-movable region allocated by the target access base station for the UE.

It should be appreciated that, the implementation of the UE may refer to that of the UE path transfer method mentioned hereinabove, with a same technical effect.

According to the UE in the embodiments of the present disclosure, the UE may acquire the control instruction for controlling the UE to be switched from the dual-connection state into the inactive state from the first source access base station communicating with the UE via the first RAT, then the UE may be controlled to be switched from the dual-connection state into the inactive state in accordance with the control instruction, and then the UE may transmit the link connection request to the target access base station and access the core network via the target access base station when it is detected that the UE in the inactive state is moved. As a result, it is able to achieve the conversion of the UE from the dual-connection state to the inactive state, and transfer the connection path for the UE in the inactive state without parts of authentication processes at the core network, thereby to remarkably reduce an access time for the UE and improve the network efficiency.

Figure 9:
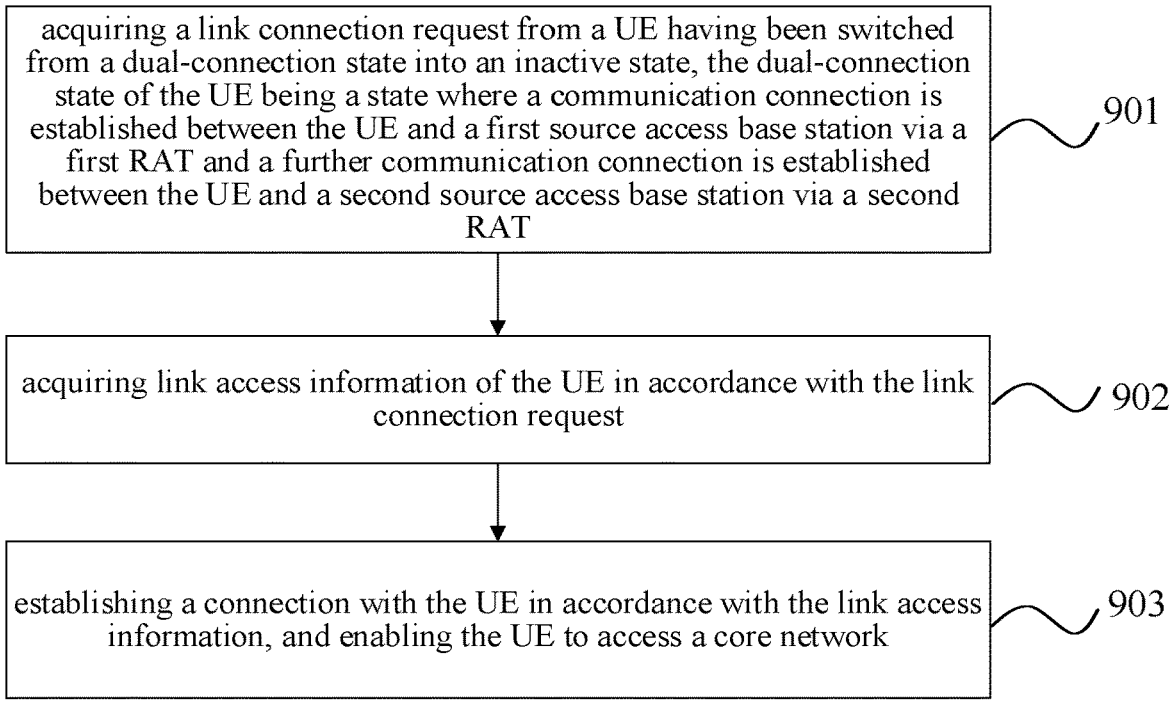
FIG. 9 is a flow chart of still yet another UE path transfer method according to some embodiments of the present disclosure.

The present disclosure further provides in some embodiments a UE path transfer method for use in a target access base station which, as shown in FIG. 9, includes the following steps.

Step 901: acquiring a link connection request from a UE having been switched from a dual-connection state into an inactive state, the dual-connection state of the UE being a state where a communication connection is established between the UE and a first source access base station via a first RAT and a further communication connection is established between the UE and a second source access base station via a second RAT.

To be specific, the link connection request may be acquired from the UE having been switched from the dual-connection state into the inactive state through a RRC message. The link connection request may include first UE identification information and second UE identification information from the first source access base station when the UE is in the dual-connection state prior to the inactive state. The first UE identification information may be a UE identifier in first RAT link configuration information corresponding to the first source access base station, and the second UE identification information may be a UE identifier in second RAT link configuration information corresponding to the second resource access base station and acquired by the first source access base station from the second source access base station.

To be specific, the link connection request may be a RRC connection establishment request, or a position updating request message, or a RRC connection recovery request message, or the like, and the link connection request may be transmitted by the UE having been switched from the dual-connection state into the inactive state when the UE has been moved out of the predetermined active region or when the RAT has changed.

Step 902: acquiring link access information of the UE in accordance with the link connection request.

To be specific, context information of the UE may be acquired in accordance with the first UE identification information or the second UE identification information.

When the context information of the UE are stored in both the first source access base station and the second source access base station, the context information of the UE may be acquired from the first source access base station in accordance with the first UE identification information, or the context information of the UE may be acquired from the second source access base station in accordance with the second UE identification information. When the context information of the UE is merely stored in the first source access base station rather than the second source access base station, the context information of the UE may be acquired from the first source access base station in accordance with the first UE identification information. When the context information of the UE is merely stored in the second source access base station rather than the first source access base station, the context information of the UE may be acquired from the second source access base station in accordance with the second UE identification information.

Step 903: establishing a connection with the UE in accordance with the link access information, and enabling the UE to access a core network.

Herein, when the first source access base station has notified the second source access base station to release a connection path between the second source access base station and the core network and a RAT type of the target access base station is the same as a RAT type of the second source access base station, the connection path between the target access base station and the core network may be established in accordance with the link access information of the UE, and the UE may access the core network via the connection path between the target access base station and the core network.

In a possible embodiment of the present disclosure, subsequent to enabling the UE to access the core network via the connection path between the target access base station and the core network, the UE path transfer method further includes: notifying the first source access base station to release a connection path between the first source access base station and the core network.

When the first source access base station has notified the second source access base station to suspend the connection path between the second source access base station and the core network and the target access base station is the second source access base station, the connection path between the second source access base station and the core network may be recovered in accordance with the link access information of the UE, and the UE may be enabled to access the core network via the recovered connection path between the second source access base station and the core network.

In a possible embodiment of the present disclosure, subsequent to enabling the UE to access the core network via the recovered connection path between the second source access base station and the core network, the UE path transfer method further includes notifying the first source access base station to suspend the connection path between the first source access base station and the core network.

When the first source access base station has notified the second source access base station to maintain the connection path between the second source access base station and the core network, a connection path between the target access base station and the core network may be established in accordance with the link access information of the UE, and the UE may be enabled to access the core network via the connection path between the target access base station and the core network.

In a possible embodiment of the present disclosure, subsequent to enabling the UE to access the core network via the connection path between the target access base station and the core network, the UE path transfer method further includes: notifying a source access base station with a same RAT type as the target access base station to release a connection path between the source access base station and the core network.

In a possible embodiment of the present disclosure, subsequent to establishing the connection with the UE in accordance with the link access information and enabling the UE to access the core network, the UE path transfer method further includes: transmitting reconfiguration information to the UE. The reconfiguration information may include UE identification information and a UE-movable region allocated by the target access base station for the UE.

According to the UE path transfer method in the embodiments of the present disclosure, the link connection request may be acquired from the UE having been switched from the dual-connection state into the inactive state, and the dual-connection state of the UE may be a state where the communication connection is established between the UE and the first source access base station via the first RAT, and the further communication connection is established between the UE and the second source access base station via the second RAT. Next, the link access information of the UE may be acquired in accordance with the link connection request. Then, the communication connection with the UE may be established in accordance with the link access information, and the UE may be enabled to access the core network. As a result, it is able to transfer the connection path for the UE in the inactive state without parts of authentication processes at the core network, thereby to remarkably reduce an access time for the UE and improve the network efficiency.

Figure 10:
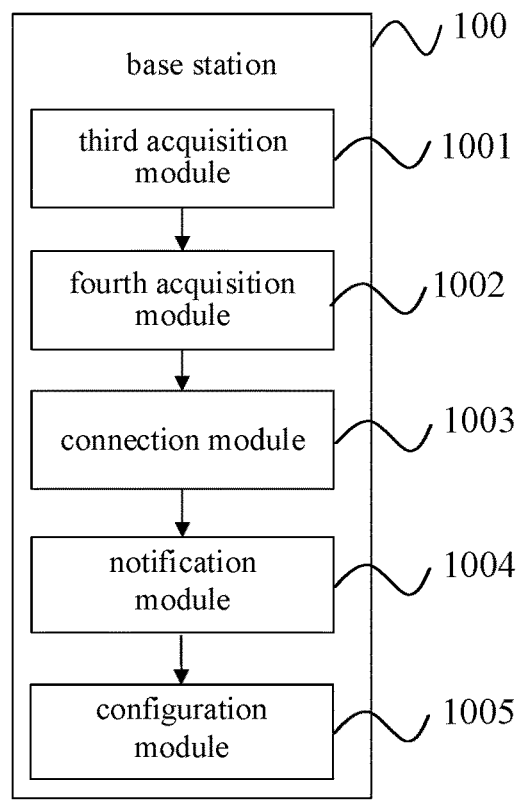
FIG. 10 is a block diagram of a base station according to some embodiments of the present disclosure.

The present disclosure further provides in some embodiments a base station 100 which, as shown in FIG. 10, includes: a third acquisition module 1001 configured to acquire a link connection request from a UE having been switched from a dual-connection state into an inactive state, the dual-connection state of the UE being a state where a communication connection is established between the UE and a first source access base station via a first RAT and a further communication connection is established between the UE and a second source access base station via a second RAT; a fourth acquisition module 1002 configured to acquire link access information of the UE in accordance with the link connection request; and a connection module 1003 configured to establish a communication connection with the UE in accordance with the link access information, and enable the UE to access a core network.

In a possible embodiment of the present disclosure, the third acquisition module 1001 is further configured to acquire the link connection request from the UE having been switched from the dual-connection state into the inactive state via a RRC message. The link connection request may include first UE identification information and second UE identification information from the first source access base station when the UE is in the dual-connection state prior to the inactive state. The first UE identification information may be a UE identifier in first RAT link configuration information corresponding to the first source access base station, and the second UE identification information may be a UE identifier in second RAT link configuration information corresponding to the second resource access base station and acquired by the first source access base station from the second source access base station.

In a possible embodiment of the present disclosure, the fourth acquisition module 1002 is further configured to acquire context information of the UE in accordance with the first UE identification information or the second UE identification information.

In a possible embodiment of the present disclosure, the fourth acquisition module 1002 is further configured to: when it is determined that the context information of the UE is stored in each of the first source access base station and the second source access base station, acquire the context information of the UE from the first source access base station in accordance with the first UE identification information, or acquire the context information of the UE from the second source access base station in accordance with the second UE identification information; when the context information of the UE is stored in the first source access base station rather than the second source access base station, acquire the context information of the UE from the first source access base station in accordance with the first UE identification information; and when the context information of the UE is stored in the second source access base station rather than the first source access base station, acquire the context information of the UE from the second source access base station in accordance with the second UE identification information.

In a possible embodiment of the present disclosure, the connection module 1003 is configured to, when the first source access base station notifies the second source access base station to release a connection path between the second source access base station and the core network and a RAT type of a target access base station is the same as a RAT type of the second source access base station, establish a connection path between the target access base station and the core network in accordance with the link access information of the UE, and enable the UE to access the core network via the connection path between the target access base station and the core network.

In a possible embodiment of the present disclosure, the base station further includes a notification module 1004 configured to notify the first source access base station to release a connection path between the first source access base station and the core network.

In a possible embodiment of the present disclosure, the connection module is further configured to, when the first source access base station has notified the second source access base station to suspend the connection path between the second source access base station and the core network and the target access base station is the second source access base station, recover the connection path between the second source access base station and the core network in accordance with the link access information of the UE, and enable the UE to access the core network via the recovered connection path between the second source access base station and the core network.

In a possible embodiment of the present disclosure, the notification module 1004 is further configured to notify the first source access base station to suspend the connection path between the first source access base station and the core network.

In a possible embodiment of the present disclosure, the connection module is configured to, when the first source access base station has notified the second source access base station to maintain the connection path between the second source access base station and the core network, establish a connection path between the target access base station and the core network in accordance with the link access information of the UE, and enable the UE to access the core network via the connection path between the target access base station and the core network.

In a possible embodiment of the present disclosure, the notification module 1004 is further configured to notify a source access base station with a same RAT type as the target access base station to release a connection path between the source access base station and the core network.

In a possible embodiment of the present disclosure, the base station further includes a notification module 1005 configured to transmit reconfiguration information to the UE. The reconfiguration information may include UE identification information and a UE-movable region allocated by the target access base station for the UE.

According to the base station in the embodiments of the present disclosure, the link connection request may be acquired from the UE having been switched from the dual-connection state into the inactive state, and the dual-connection state of the UE may be a state where the communication connection is established between the UE and the first source access base station via the first RAT, and the further communication connection is established between the UE and the second source access base station via the second RAT. Next, the link access information of the UE may be acquired in accordance with the link connection request. Then, the communication connection with the UE may be established in accordance with the link access information, and the UE may be enabled to access the core network. As a result, it is able to transfer the connection path for the UE in the inactive state without parts of authentication processes at the core network, thereby to remarkably reduce an access time for the UE and improve the network efficiency.

The present disclosure further provides in some embodiments a UE state conversion control method which, as shown in FIG. 11, includes the following steps.

Step 111: generating a control instruction for controlling a UE to be switched from a dual-connection state into an inactive state. The dual-connection state of the UE may be a state where a communication connection is established between the UE and a first source access base station via a first RAT and a further communication connection is established between the UE and a second source access base station via a second RAT.

Subsequent to Step 111, the UE state conversion control method further includes: transmitting a notification message for configuring the UE to be in the inactive state to the second source access base station; acquiring second RAT link configuration information transmitted by the second source access base station in accordance with the notification message, the second RAT link configuration information including a second predetermined active region and second UE identification information; and transmitting the second RAT link configuration information and pre-configured first RAT link configuration information to the UE, the first RAT link configuration information including a first predetermined active region and first UE identification information.

In a possible embodiment of the present disclosure, prior to acquiring the second RAT link configuration information transmitted by the second source access base station in accordance with the notification message, the UE state conversion control method further includes: transmitting context information of the UE to the second source access base station, so as to acquire the context information of the UE from the second source access base station in accordance with the second UE identification information and transmit the context information of the UE to a target access base station when the second source access base station has received a context acquisition request carrying the second UE identification information from the target access base station.

In a possible embodiment of the present disclosure, subsequent to transmitting the control instruction for controlling the UE to be switched from the dual-connection state into the inactive state to the UE, the UE state conversion control method further includes: acquiring the context acquisition request carrying the first UE identification information from the target access base station; and acquiring the context information of the UE in accordance with the first UE identification information, and transmitting the context information of the UE to the target access base station.

Step 112: transmitting the control instruction for controlling the UE to be switched from the dual-connection state into the inactive state to the UE, so as to control the UE to be switched from the dual-connection state into the inactive state according to the control instruction.

According to the UE state conversion control method in the embodiments of the present disclosure, the control instruction for controlling the UE to be switched from the dual-connection state into the inactive state may be generated, and the dual-connection state of the UE may be a state where the communication connection is established between the UE and the first source access base station via the first RAT, and the communication connection is established between the UE and the second source access base station via the second RAT. Then, the control instruction for controlling the UE to be switched from the dual-connection state into the inactive state may be transmitted to the UE, so as to control the UE to be switched from the dual-connection state into the inactive state according to the control instruction. As a result, it is able to perform the state conversion on the UE which is served by two communication systems simultaneously.

The present disclosure further provides in some embodiments a base station 1200 which, as shown in FIG. 12, includes: a decision module 1201 configured to generate a control instruction for controlling a UE to be switched from a dual-connection state into an inactive state, the dual-connection state of the UE being a state where a communication connection is established between the UE and a first source access base station via a first RAT and a further communication connection is established between the UE and a second source access base station via a second RAT; and a first transmission module 1202 configured to transmit the control instruction for controlling the UE to be switched from the dual-connection state into the inactive state to the UE, so as to control the UE to be switched from the dual-connection state into the inactive state according to the control instruction.

In a possible embodiment of the present disclosure, the base station further includes: a second transmission module 1203 configured to transmit a notification message for configuring the UE to be in the inactive state to the second source access base station; a fifth acquisition module 1204 configured to acquire second RAT link configuration information transmitted by the second source access base station in accordance with the notification message, the second RAT link configuration information including a second predetermined active region and second UE identification information; and a third transmission module 1205 configured to transmit the second RAT link configuration information and pre-configured first RAT link configuration information to the UE, the first RAT link configuration information including a first predetermined active region and first UE identification information.

In a possible embodiment of the present disclosure, the base station further includes: a fifth transmission module 1206 configured to transmit context information of the UE to the second source access base station, so as to acquire the context information of the UE from the second source access base station in accordance with the second UE identification information and transmit the context information of the UE to a target access base station when the second source access base station has received a context acquisition request carrying the second UE identification information from the target access base station.

In a possible embodiment of the present disclosure, the base station further includes: a context acquisition module 1207 configured to acquire the context acquisition request carrying the first UE identification information from the target access base station; and a sixth transmission module 1208 configured to acquire the context information of the UE in accordance with the first UE identification information, and transmit the context information of the UE to the target access base station.

According to the base station in the embodiments of the present disclosure, the control instruction for controlling the UE to be switched from the dual-connection state into the inactive state may be generated, and the dual-connection state of the UE may be a state where the communication connection is established between the UE and the first source access base station via the first RAT, and the further communication connection is established between the UE and the second source access base station via the second RAT. Then, the control instruction for controlling the UE to be switched from the dual-connection state into the inactive state may be transmitted to the UE, so as to control the UE to be switched from the dual-connection state into the inactive state according to the control instruction. As a result, it is able to perform the state conversion on the UE which is served by two communication systems simultaneously.

The present disclosure further provides in some embodiments a UE state conversion control method which, as shown in FIG. 13, includes: Step 131 of acquiring a notification message for configuring a UE to be in an inactive state from a first source access base station, the notification message being transmitted after the first source access base station has generated a control instruction for controlling the UE to be switched from a dual-connection state into the inactive state, the dual-connection state being a state where a communication connection is established between the UE and a first source access base station via a first RAT and a further communication connection is established between the UE and a second source access base station via a second RAT; and Step 132 of transmitting second RAT link configuration information to the first source access base station in accordance with the notification message, so as to enable the first source access base station to transmit the second RAT link configuration information and pre-configured first RAT link configuration information to the UE and control the UE to be switched from the dual-connection state into the inactive state, the first RAT link configuration information including a first predetermined active region and first UE identification information, and the second RAT link configuration information including a second predetermined active region and second UE identification information.

In a possible embodiment of the present disclosure, prior to transmitting the second RAT link configuration information to the first source access base station in accordance with the notification message, the UE state conversion control method further includes: acquiring a first notification instruction for controlling the second source access base station to release a connection path between the second source access base station and a core network from the first source access base station, and releasing the connection path between the second source access base station and the core network in accordance with the first notification instruction; or acquiring a second notification instruction for controlling the second source access base station to suspend the connection path between the second source access base station and the core network from the first source access base station, and suspending the connection path between the second source access base station and the core network in accordance with the second notification instruction.

According to the UE state conversion control method in the embodiments of the present disclosure, the notification message for configuring the UE to be in the inactive state may be acquired from the first source access base station, and then the second RAT link configuration information may be transmitted to the first source access base station in accordance with the notification message, so as to enable the first source access base station to transmit the second RAT link configuration information and the pre-configured first RAT link configuration information to the UE and control the UE to be switched from the dual-connection state into the inactive state. As a result, it is able to perform the state conversion on the UE which is served by two communication systems simultaneously.

The present disclosure further provides in some embodiments a base station 1400 which, as shown in FIG. 14, includes: a sixth acquisition module 1401 configured to acquire a notification message for configuring a UE to be in an inactive state from a first source access base station, the notification message being transmitted after the first source access base station has generated a control instruction for controlling the UE to be switched from a dual-connection state into the inactive state, the dual-connection state being a state where a communication connection is established between the UE and a first source access base station via a first RAT and a further communication connection is established between the UE and a second source access base station via a second RAT; and a fourth transmission module 1402 configured to transmit second RAT link configuration information to the first source access base station in accordance with the notification message, so as to enable the first source access base station to transmit the second RAT link configuration information and pre-configured first RAT link configuration information to the UE and control the UE to be switched from the dual-connection state into the inactive state, the first RAT link configuration information including a first predetermined active region and first UE identification information, and the second RAT link configuration information including a second predetermined active region and second UE identification information.

In a possible embodiment of the present disclosure, the base station further includes a seventh acquisition module 1403 configured to: acquire a first notification instruction for controlling the second source access base station to release a connection path between the second source access base station and a core network from the first source access base station, and release the connection path between the second source access base station and the core network in accordance with the first notification instruction; or acquire a second notification instruction for controlling the second source access base station to suspend the connection path between the second source access base station and the core network from the first source access base station, and suspend the connection path between the second source access base station and the core network in accordance with the second notification instruction.

According to the base station in the embodiments of the present disclosure, the notification message for configuring the UE to be in the inactive state may be acquired from the first source access base station, and then the second RAT link configuration information may be transmitted to the first source access base station in accordance with the notification message, so as to enable the first source access base station to transmit the second RAT link configuration information and the pre-configured first RAT link configuration information to the UE and control the UE to be switched from the dual-connection state into the inactive state. As a result, it is able to perform the state conversion on the UE which is served by two communication systems simultaneously.

Figure 15:
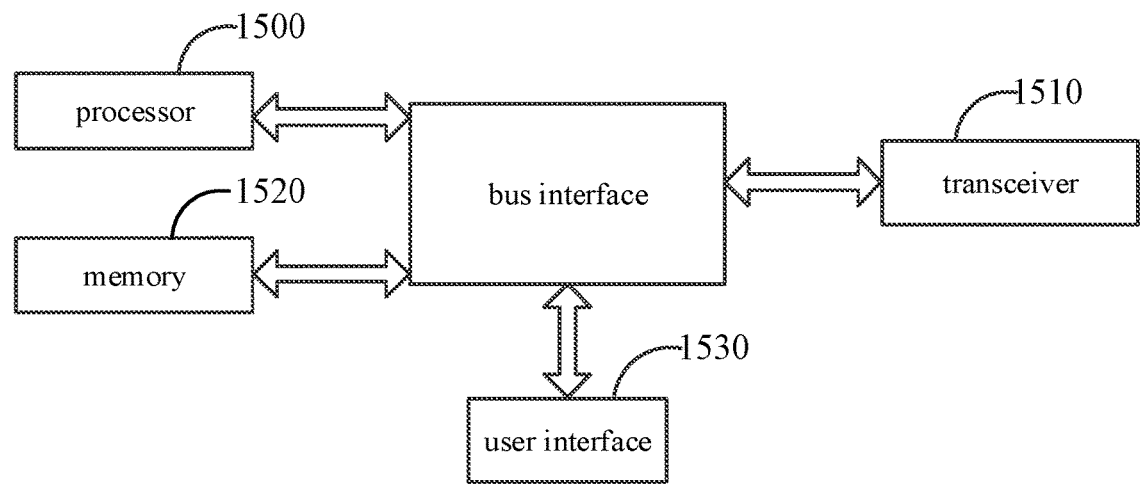
FIG. 15 is a block diagram of yet another UE according to some embodiments of the present disclosure.

The present disclosure further provides in some embodiments a UE which, as shown in FIG. 15, includes a processor 1500, a memory 1520 connected to the processor 1500 via a bus interface, and a transceiver 1510 connected to the processor 1500 via the bus interface. The memory is configured to store therein programs and data for the operation of the processor. The transceiver 1510 is configured to receive a downlink control channel. The processor 1500 is configured to call and execute the programs and data stored in the memory 1520, so as to achieve the following modules: the first acquisition module configured to acquire a control instruction for controlling a UE to be switched from a dual-connection state into an inactive state from a first source access base station communicating with the UE via a first RAT, the dual-connection state of the UE being a state where a communication connection is established between the UE and the first source access base station via the first RAT and a further communication connection is established between the UE and a second source access base station via a second RAT; the control module configured to control the UE to be switched from the dual-connection state into the inactive state in accordance with the control instruction; and the processing module configured to transmit a link connection request to a target access base station and enable the UE to access a core network via the target access base station when it is detected that the UE in the inactive state is moved.

The processor 1500 is configured to read and execute the programs stored in the memory 1520, so as to: acquire, through the transceiver 1510, a control instruction for controlling a UE to be switched from a dual-connection state into an inactive state from a first source access base station communicating with the UE via a first RAT, the dual-connection state of the UE being a state where a communication connection is established between the UE and the first source access base station via the first RAT and a further communication connection is established between the UE and a second source access base station via a second RAT; control the UE to be switched from the dual-connection state into the inactive state in accordance with the control instruction; and transmit, through the transceiver 1510, a link connection request to a target access base station and enable the UE to access a core network via the target access base station when it is detected that the UE in the inactive state is moved. The transceiver 1510 is configured to receive and transmit data under the control of the processor 1500.

In FIG. 15, bus architecture may include a number of buses and bridges connected to each other, so as to connect various circuits for one or more processors such as the processor 1500 and one or more memories such as the memory 1520. In addition, the bus architecture may be used to connect various other circuits, such as a circuit for a peripheral device, a circuit for a voltage stabilizer and a power management circuit. A bus interface may be provided, and the transceiver 1510 may consist of more than one element, e.g., a transmitter and a receiver for communication with various other devices over a transmission medium. With respect to different UEs, a user interface 1530 may also be provided for devices which are to be arranged inside or outside the UE, and these devices may include but not limited to a keypad, a display, a speaker, a microphone and a joystick. The processor 1500 may take charge of managing the bus architecture as well general processings. The memory 1520 may store therein data for the operation of the processor 1500.

According to the UE in the embodiments of the present disclosure, the processor 1500 may acquire the control instruction for controlling the UE to be switched from the dual-connection state into the inactive state from the first source access base station communicating with the UE via the first RAT, control the UE to be switched from the dual-connection state into the inactive state in accordance with the control instruction, and transmit the link connection request to the target access base station and enable the UE to access the core network via the target access base station when it is detected that the UE in the inactive state is moved. As a result, it is able to achieve the conversion of the UE from the dual-connection state to the inactive state, and transfer the connection path for the UE in the inactive state without parts of authentication processes at the core network, thereby to remarkably reduce an access time for the UE and improve the network efficiency.

Figure 16:
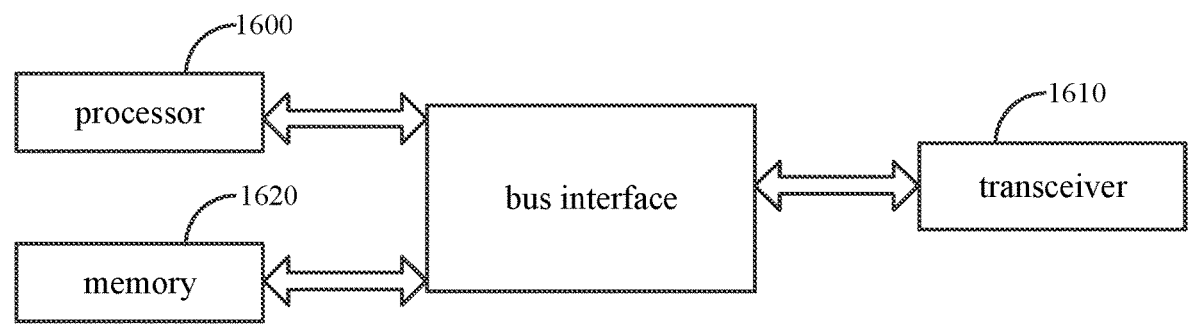
FIG. 16 is a block diagram of still yet another base station according to some embodiments of the present disclosure.

The present disclosure further provides in some embodiments a base station which, as shown in FIG. 16, includes a processor 1600, a memory 1620 connected to the processor 1600 via a bus interface, and a transceiver 1610 connected to the processor 1600 via the bus interface. The memory is configured to store therein programs and data for the operation of the processor. The transceiver 1610 is configured to transmit data information or a pilot signal, and receive an uplink control channel. The processor 1600 is configured to call and execute the programs and data stored in the memory 1620, so as to achieve the following modules: the third acquisition module configured to acquire a link connection request from a UE having been switched from a dual-connection state into an inactive state, the dual-connection state of the UE being a state where a communication connection is established between the UE and a first source access base station via a first RAT and a further communication connection is established between the UE and a second source access base station via a second RAT; the fourth acquisition module configured to acquire link access information of the UE in accordance with the link connection request; and the connection module configured to establish a communication connection with the UE in accordance with the link access information, and enable the UE to access a core network.

The processor 1600 is configured to read and execute the programs stored in the memory 1620, so as to: acquire, through the transceiver 1610, a link connection request from a UE having been switched from a dual-connection state into an inactive state, the dual-connection state of the UE being a state where a communication connection is established between the UE and a first source access base station via a first RAT and a further communication connection is established between the UE and a second source access base station via a second RAT; acquire, through the transceiver 1610, link access information of the UE in accordance with the link connection request; and establish a communication connection with the UE in accordance with the link access information, and enable the UE to access a core network. The transceiver 1610 is configured to receive and transmit data under the control of the processor 1600.

In FIG. 16, bus architecture may include a number of buses and bridges connected to each other, so as to connect various circuits for one or more processors such as the processor 1600 and one or more memories such as the memory 1620. In addition, the bus architecture may be used to connect various other circuits, such as a circuit for a peripheral device, a circuit for a voltage stabilizer and a power management circuit. A bus interface may be provided, and the transceiver 1610 may consist of more than one element, e.g., a transmitter and a receiver for communication with various other devices over a transmission medium. The processor 1600 may take charge of managing the bus architecture as well general processings. The memory 1620 may store therein data for the operation of the processor 1600.

The processor 1600 may take charge of managing the bus architecture as well general processings. The memory 1620 may store therein data for the operation of the processor 1600.

According to the base station in the embodiments of the present disclosure, the processor 1600 may acquire the link connection request from the UE having been switched from the dual-connection state into the inactive state, and the dual-connection state of the UE may be a state where the communication connection is established between the UE and the first source access base station via the first RAT, and the further communication connection is established between the UE and the second source access base station via the second RAT. Then, the processor may acquire the link access information of the UE in accordance with the link connection request, and establish the communication connection with the UE in accordance with the link access information, and enable the UE to access the core network. As a result, it is able to transfer the connection path for the UE in the inactive state without parts of authentication processes at the core network, thereby to remarkably reduce an access time for the UE and improve the network efficiency.

The present disclosure further provides in some embodiments a base station which includes a processor, a memory connected to the processor via a bus interface, and a transceiver connected to the processor via the bus interface. The memory is configured to store therein programs and data for the operation of the processor. The transceiver is configured to transmit data information or a pilot signal, and receive an uplink control channel. The processor is configured to call and execute the programs and data stored in the memory, so as to achieve the following modules: a decision module configured to generate a control instruction for controlling a UE to be switched from a dual-connection state into an inactive state, the dual-connection state of the UE being a state where a communication connection is established between the UE and a first source access base station via a first RAT and a further communication connection is established between the UE and a second source access base station via a second RAT; and a first transmission module configured to transmit the control instruction for controlling the UE to be switched from the dual-connection state into the inactive state to the UE, so as to control the UE to be switched from the dual-connection state into the inactive state in accordance with the control instruction.

The processor is configured to read and execute the programs stored in the memory, so as to: generate a control instruction for controlling a UE to be switched from a dual-connection state into an inactive state, the dual-connection state of the UE being a state where a communication connection is established between the UE and a first source access base station via a first RAT and a further communication connection is established between the UE and a second source access base station via a second RAT; and transmit, through the transceiver, the control instruction for controlling the UE to be switched from the dual-connection state into the inactive state to the UE, so as to control the UE to be switched from the dual-connection state into the inactive state in accordance with the control instruction. The transceiver is configured to receive and transmit data under the control of the processor.

Bus architecture may include a number of buses and bridges connected to each other, so as to connect various circuits for one or more processors and one or more memories. In addition, the bus architecture may be used to connect various other circuits, such as a circuit for a peripheral device, a circuit for a voltage stabilizer and a power management circuit. The bus interface may be provided, and the transceiver may consist of a plurality of elements, i.e., a transmitter and a receiver for communication with various other devices over a transmission medium. The processor may take charge of managing the bus architecture as well as general processings. The memory may store therein data for the operation of the processor.

The processor may take charge of managing the bus architecture as well as general processings. The memory may store therein data for the operation of the processor.

According to the base station in the embodiments of the present disclosure, the processor may generate a control instruction for controlling the UE to be switched from the dual-connection state into the inactive state, and the dual-connection state of the UE may be a state where the communication connection is established between the UE and the first source access base station via the first RAT, and the further communication connection is established between the UE and the second source access base station via the second RAT. Then, the processor may transmit the control instruction for controlling the UE to be switched from the dual-connection state into the inactive state to the UE, so as to control the UE to be switched from the dual-connection state into the inactive state in accordance with the control instruction. As a result, it is able to perform the state conversion on the UE which is served by two communication systems simultaneously.

The present disclosure further provides in some embodiments a base station which includes a processor, a memory connected to the processor via a bus interface, and a transceiver connected to the processor via the bus interface. The memory is configured to store therein programs and data for the operation of the processor. The transceiver is configured to transmit data information or a pilot signal, and receive an uplink control channel. The processor is configured to call and execute the programs and data stored in the memory, so as to achieve the following modules: a sixth acquisition module configured to acquire a notification message for configuring a UE to be in an inactive state from a first source access base station, the notification message being transmitted after the first source access base station has generated a control instruction for controlling the UE to be switched from a dual-connection state into the inactive state, the dual-connection state being a state where a communication connection is established between the UE and a first source access base station via a first RAT and a further communication connection is established between the UE and a second source access base station via a second RAT; and a fourth transmission module configured to transmit second RAT link configuration information to the first source access base station in accordance with the notification message, so as to enable the first source access base station to transmit the second RAT link configuration information and pre-configured first RAT link configuration information to the UE and control the UE to be switched from the dual-connection state into the inactive state, the first RAT link configuration information including a first predetermined active region and first UE identification information, and the second RAT link configuration information including a second predetermined active region and second UE identification information.

The processor is configured to read and execute the programs stored in the memory, so as to: acquire, through the transceiver, a notification message for configuring a UE to be in an inactive state from a first source access base station, the notification message being transmitted after the first source access base station has generated a control instruction for controlling the UE to be switched from a dual-connection state into the inactive state, the dual-connection state being a state where a communication connection is established between the UE and a first source access base station via a first RAT and a further communication connection is established between the UE and a second source access base station via a second RAT; and transmit, through the transceiver, second RAT link configuration information to the first source access base station in accordance with the notification message, so as to enable the first source access base station to transmit the second RAT link configuration information and pre-configured first RAT link configuration information to the UE and control the UE to be switched from the dual-connection state into the inactive state, the first RAT link configuration information including a first predetermined active region and first UE identification information, and the second RAT link configuration information including a second predetermined active region and second UE identification information. The transceiver is configured to receive and transmit data under the control of the processor.

Bus architecture may include a number of buses and bridges connected to each other, so as to connect various circuits for one or more processors and one or more memories. In addition, the bus architecture may be used to connect various other circuits, such as a circuit for a peripheral device, a circuit for a voltage stabilizer and a power management circuit. The bus interface may be provided, and the transceiver may consist of a plurality of elements, i.e., a transmitter and a receiver for communication with various other devices over a transmission medium. The processor may take charge of managing the bus architecture as well as general processings. The memory may store therein data for the operation of the processor.

According to the base station in the embodiments of the present disclosure, the processor may acquire the notification message for configuring the UE to be in the inactive state from the first source access base station, and transmit the second RAT link configuration information to the first source access base station in accordance with the notification message, so as to enable the first source access base station to transmit the second RAT link configuration information and the pre-configured first RAT link configuration information to the UE and control the UE to be switched from the dual-connection state into the inactive state. As a result, it is able to perform state conversion on the UE which is served by two communication systems simultaneously.

The above embodiments are for illustrative purposes only, but the present disclosure is not limited thereto. A person skilled in the art may make further modifications, equivalent substitution and improvements without departing from the spirit of the present disclosure, and these modifications, equivalent substitution and improvements shall also fall within the scope of the present disclosure.

What is claimed is:

1. A User Equipment (UE) path transfer method, comprising:

acquiring a control instruction transmitted from a first source access base station communicating with a UE via a first Radio Access Technology (RAT), the control instruction being configured to control the UE to be switched from a dual-connection state into an inactive state, and the dual-connection state of the UE being a state where a communication connection is established between the UE and the first source access base station via the first RAT and a further communication connection is established between the UE and a second source access base station via a second RAT, wherein the inactive state of the UE is a state where the context information about the UE is reserved at one or both of the first source access base station and the second source access base station;

controlling the UE to be switched from the dual-connection state into the inactive state in accordance with the control instruction; and transmitting a link connection request to a target access base station and enabling the UE to access a core network via the target access base station when the UE in the inactive state is moved, the link connection request causing the core network to send context release notifications to the first source access base station and the second source access base station; and receiving, from the target access base station, a reconfiguration information in response to the target access base station receiving a path transfer completion information from the core network, wherein receiving a path transfer completion information is in response to the target base station receiving the context information of the UE from the first source access base station and the second source access base station and the target base station transmitting a path transfer request to the core network in accordance with the context information;

wherein prior to controlling the UE to be switched from the dual-connection state into the inactive state in accordance with the control instruction, the method further comprises:

acquiring first RAT link configuration information and second RAT link configuration information transmitted from the first source access base station, wherein the first RAT link configuration information comprises a first predetermined active region and first UE identification information, the second RAT link configuration information comprises a second predetermined active region and second UE identification information, and the second RAT link configuration information is acquired by the first source access base station from the second source access base station, wherein the transmitting the link connection request to the target access base station and enabling the UE to access the core network via the target access base station when it is detected that the UE in the inactive state is moved comprises:

in response to the UE in the inactive state being moved from the first predetermined active region to the second predetermined active region or being moved out of the first predetermined active region and the second predetermined active region, transmitting the link connection request to the target access base station, and enabling the UE to access the core network via the target access base station.

2. The UE path transfer method according to claim 1, wherein the transmitting the link connection request to the target access base station and enabling the UE to access the core network via the target access base station comprises:

transmitting the link connection request to the target access base station via a Radio Resource Control (RRC) message, and enabling the UE to access the core network via the target access base station, wherein the first UE identification information and/or the second UE identification information are carried in the RRC message.

3. The UE path transfer method according to claim 1, wherein the reconfiguration information comprising UE identification information and a UE-movable region allocated by the target access base station for the UE.

4. A UE path transfer method, comprising:

acquiring a link connection request transmitted from a UE having been switched from a dual-connection state into an inactive state, and the dual-connection state being a state where a communication connection is established between the UE and a first source access base station via a first RAT and a further communication connection is established between the UE and a second source access base station via a second RAT, wherein the inactive state of the UE is a state where the context information about the UE is reserved at one or both of the first source access base station and the second source access base station, the link connection request comprises first UE identification information and second UE identification information transmitted from the first source access base station when the UE is in the dual-connection state prior to the inactive state, the first UE identification information is a UE identifier in first RAT link configuration information corresponding to the first source access base station, the second UE identification information is a UE identifier in second RAT link configuration information corresponding to a second resource access base station and acquired by the first source access base station from the second source access base station, and the link connection request causing a core network to send context release notifications to the first source access base station and the second source access base station;

acquiring link access information of the UE in accordance with the link connection request transmitted from the UE in response to the UE in the inactive state being moved from a first predetermined active region comprised in the first RAT link configuration information to a second predetermined active region comprised in the second RAT link configuration information or being moved out of the first predetermined active region and the second predetermined active region;

establishing a connection with the UE in accordance with the link access information, and enabling the UE to access the core network; and transmitting, by a target access base station, a reconfiguration information to the UE in response to the target access base station receiving a path transfer completion information from the core network, wherein receiving the path transfer completion information is in response to the target base station receiving the context information of the UE from the first source access base station and the second source access base station and the target base station transmitting a path transfer request to the core network in accordance with the context information.

5. The UE path transfer method according to claim 4, wherein the acquiring the link connection request transmitted from the UE having been switched from the dual-connection state into the inactive state comprises:

acquiring the link connection request transmitted from the UE having been switched from the dual-connection state into the inactive state via a RRC message.

6. The UE path transfer method according to claim 5, wherein the acquiring the link access information of the UE in accordance with the link connection request comprises:

acquiring the context information of the UE in accordance with the first UE identification information or the second UE identification information.

7. The UE path transfer method according to claim 6, wherein the acquiring the context information of the UE in accordance with the first UE identification information or the second UE identification information comprises:

when the context information of the UE is stored in each of the first source access base station and the second source access base station, acquiring the context information of the UE from the first source access base station in accordance with the first UE identification information, or acquiring the context information of the UE from the second source access base station in accordance with the second UE identification information.

8. The UE path transfer method according to claim 4, wherein the establishing the connection with the UE in accordance with the link access information and enabling the UE to access the core network comprises:

when the first source access base station has notified the second source access base station to release a connection path between the second source access base station and the core network, and a RAT type of a target access base station is same as a RAT type of the second source access base station, establishing a connection path between the target access base station and the core network in accordance with the link access information of the UE, and enabling the UE to access the core network via the connection path between the target access base station and the core network.

9. The UE path transfer method according to claim 8, wherein subsequent to enabling the UE to access the core network via the connection path between the target access base station and the core network, the UE path transfer method further comprises:
notifying the first source access base station to release a connection path between the first source access base station and the core network.

10. The UE path transfer method according to claim 4, wherein the establishing the connection with the UE in accordance with the link access information and enabling the UE to access the core network comprises:
when the first source access base station has notified the second source access base station to maintain a connection path between the second source access base station and the core network, establishing a connection path between a target access base station and the core network in accordance with the link access information of the UE, and enabling the UE to access the core network via the connection path between the target access base station and the core network.

11. The UE path transfer method according to claim 10, wherein subsequent to enabling the UE to access the core network via the connection path between the target access base station and the core network, the UE path transfer method further comprises:
notifying a source access base station to release a connection path between the source access base station and the core network, wherein a RAT type of the source access base station is same as a RAT type of the target access base station.

12. The UE path transfer method according to claim 4, wherein the reconfiguration information comprises UE identification information and a UE-movable region allocated by a target access base station for the UE.

13. A UE state conversion control method, comprising:
generating a control instruction for controlling a UE to be switched from a dual-connection state into an inactive state, and the dual-connection state of the UE being a state where a communication connection is established between the UE and a first source access base station via a first RAT and a further communication connection is established between the UE and a second source access base station via a second RAT, wherein the inactive state of the UE is a state where the context information about the UE is reserved at one or both of the first source access base station and the second source access base station; and
transmitting the control instruction for controlling the UE to be switched from the dual-connection state into the inactive state to the UE, to enable the UE to be switched from the dual-connection state into the inactive state according to the control instruction,
wherein subsequent to generating the control instruction for controlling the UE to be switched from the dual-connection state into the inactive state, the UE state conversion control method further comprises:
transmitting a notification message for configuring the UE to be in the inactive state to the second source access base station;
acquiring second RAT link configuration information transmitted by the second source access base station in accordance with the notification message, and the second RAT link configuration information comprising a second predetermined active region and second UE identification information; and
transmitting the second RAT link configuration information and pre-configured first RAT link configuration information to the UE, and the first RAT link configuration information comprising a first predetermined active region and first UE identification information, to enable the UE to transmit a link connection request to a target access base station, and enable the UE to access a core network via the target access base station in response to the UE in the inactive state being moved from the first predetermined active region to the second predetermined active region or being moved out of the first predetermined active region and the second predetermined active region,
wherein the link connection request causes the core network to send context release notifications to the first source access base station and the second source access base station, a reconfiguration information is received by the UE from the target access base station in response to the target access base station receiving a path transfer completion information from the core network, wherein a path transfer completion information is received by the UE in response to the target base station receiving the context information from the first source access base station and the second source access base station and the target base station transmitting a path transfer request to the core network in accordance with the context information.

14. A UE for implementing the UE path transfer method according to claim 1, wherein the UE comprises a processor, a memory and a transceiver, wherein
the processor is configured to read a program stored in the memory to:
acquire, through a transceiver, the control instruction transmitted from the first source access base station communicating with the UE via the first RAT, wherein the control instruction is configured to control the UE to be switched from the dual-connection state into the inactive state;
control the UE to be switched from the dual-connection state into the inactive state in accordance with the control instruction; and
transmit, through the transceiver, the link connection request to the target access base station and enable the UE to access the core network via the target access base station when it is detected that the UE in the inactive state is moved,
the transceiver is configured to receive and transmit data, and
the memory is configured to store therein data for the operation of the processor.

* * * * *